US011507889B2

(12) United States Patent
Kelsey et al.

(10) Patent No.: US 11,507,889 B2
(45) Date of Patent: Nov. 22, 2022

(54) LAMINATE NONCONFORMANCE MANAGEMENT SYSTEM

(71) Applicant: The Boeing Company, Chicago, IL (US)

(72) Inventors: William David Kelsey, Issaquah, WA (US); Amir Afrasiabi, Seattle, WA (US); Brian Dale Laughlin, Wichita, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/457,051

(22) Filed: Dec. 1, 2021

(65) Prior Publication Data

US 2022/0083912 A1 Mar. 17, 2022

Related U.S. Application Data

(62) Division of application No. 16/436,074, filed on Jun. 10, 2019, now Pat. No. 11,222,284.

(51) Int. Cl.
*G06N 20/00* (2019.01)
*B32B 41/00* (2006.01)
(Continued)

(52) U.S. Cl.
CPC ......... *G06N 20/00* (2019.01); *B32B 38/1808* (2013.01); *B32B 41/00* (2013.01);
(Continued)

(58) Field of Classification Search
CPC .... G06N 20/00; B32B 38/1808; B32B 41/00; G06T 7/0002; G06T 11/60; G06F 3/017;
(Continued)

(56) References Cited

U.S. PATENT DOCUMENTS 4,946,526 A 8/1990 Petty-Galis et al.
5,976,671 A 11/1999 Gleim
(Continued)

FOREIGN PATENT DOCUMENTS

EP 3372342 A1 9/2018
WO 2018223038 A1 12/2018

OTHER PUBLICATIONS

European Patent Office Extended Search Report, dated Oct. 7, 2020, regarding Application No. 20167267.2, 10 pages.
(Continued)

*Primary Examiner* — George R Koch
(74) *Attorney, Agent, or Firm* — Yee & Associates, P.C.

(57) ABSTRACT

A method for managing nonconformances in laminates. The method comprises recording, by a sensor system, layup information about a layup of layers on a workpiece platform, wherein the layup of layers forms a workpiece and recording inspection information about the laminate on an inspection platform, wherein the laminate is formed from curing the workpiece. An analyzer in a computer system identifies a laminate nonconformance in the laminate using the inspection information and a user input verifies the laminate nonconformance in the laminate is present. An artificial intelligence system is trained by the computer system using the layup information, the inspection information, and the user input verifying the laminate nonconformance.

20 Claims, 13 Drawing Sheets

(51) Int. Cl.
    *G06T 11/60*      (2006.01)
    *G06T 7/00*       (2017.01)
    *B32B 38/18*      (2006.01)
    *G06F 3/01*       (2006.01)
(52) U.S. Cl.
    CPC ............ *G06T 7/0002* (2013.01); *G06T 11/60* (2013.01); *G06F 3/017* (2013.01)
(58) Field of Classification Search
    CPC ..... B29C 70/38; B29C 70/382; B29C 70/384; B29C 70/386; B29C 70/388
    See application file for complete search history.

(56) References Cited

U.S. PATENT DOCUMENTS

| | | |
|---|---|---|
| 2003/0102070 A1 | 6/2003 | black et al. |
| 2005/0052516 A1 | 3/2005 | Wilde et al. |
| 2010/0168891 A1 | 7/2010 | Kretsis |
| 2016/0341671 A1 | 11/2016 | Maass |
| 2018/0017499 A1 | 1/2018 | Monchalin et al. |
| 2018/0350056 A1 | 12/2018 | Cardenas Bernal |
| 2019/0318444 A1 | 10/2019 | Juarez et al. |
| 2020/0166909 A1 | 5/2020 | Noone et al. |
| 2020/0387824 A1 | 12/2020 | Kelsey et al. |

OTHER PUBLICATIONS

Crespino et al., "Anomaly Detection in Aerospace Product Manufacturing: initial remarks," IEEE 2nd International Forum on Research and Technologies for Society and Industry Leveraging a better tomorrow (RTSI), 2016, XP033000340, pp. 1-4.

Ciliberto et al., "Porosity Detection in Composite Aeronautical Structures," Infrared Physics and Technology, vol. 43, 2002, XP055733823, pp. 139-143.

USPTO Office Action, dated Aug. 5, 2021, regarding U.S. Appl. No. 16/436,074, 31 pages.

USPTO Notice of Allowance, dated Sep. 7, 2021, regarding U.S. Appl. No. 16/436,074, 10 pages.

LAMINATE NONCONFORMANCE MANAGEMENT SYSTEM

CROSS-REFERENCE TO RELATED APPLICATION

This application is a divisional application of U.S. patent application Ser. No. 16/436,074, filed Jun. 10, 2019, now U.S. Pat. No. 11,222,284 B2, which is herein incorporated by reference.

BACKGROUND INFORMATION

1. Field

The present disclosure relates generally to manufacturing parts and, in particular, to fabricating laminates for parts. Still more particularly, the present disclosure relates to a method, apparatus, and system for managing nonconformances in laminates.

2. Background

A laminate is a structure that is manufactured in multiple layers. A laminate may have desirable characteristics such as increased strength, stability, sound insulation, appearance, or other characteristics from the selection of the layers used to form the laminate.

Stacks of raw materials may be laid up in layers. This layup of layers can be laid up on a first metal caul plate. The layup of layers can be, for example, a first polyvinyl fluoride (PVF) layer, an embossing resin (ER) layer, and a second polyvinyl fluoride layer. The embossing resin layer is located between the first polyvinyl fluoride layer and the second polyvinyl fluoride layer. These layers form a workpiece or sandwich.

Multiple workpieces can be laid up from multiple layers. The layup is typically performed at a build station. The first workpiece is laid up on the caul plate on a platform at the build station. Subsequent workpieces can be formed from laying up layers to form addition workpieces on top of the first workpiece. These different workpieces can be separated from each other by release sheets or types of layers that provide an ability to keep separate laminates formed from curing these workpieces. Additionally, texture layers can be included to form a texture in the laminates.

When all of the workpieces are laid up, a second metal caul plate is placed on top of the last workpiece to form a tray. The tray is placed in a press for processing of the workpieces. The press applies pressure to the layers for the workpieces. Further, the temperature can be raised to heat the layers in the tray as pressure is applied by the press as part of the curing process.

After the workpieces have been cured to form laminates, the tray is returned to the build station for further processing. At the build station, the laminates are inspected by human operators. The inspection is performed to determine whether a nonconformance is present that prevents use of the laminate in manufacturing parts. Laminates that pass inspection are prepared and routed for further processing to create parts from the laminates.

Currently, this process results in more scrap from laminates that have nonconformances than desired. Detecting these nonconformances from visual inspections can be tedious error prone, and relies on the skill of the operator. It would be desirable to have a method and apparatus that take into account at least some of the issues discussed above, as well as other possible issues. For example, it would be desirable to have a method and apparatus that overcome a technical problem with accurately identifying nonconformances in laminates.

SUMMARY

An embodiment of the present disclosure provides a method for managing manufacturing of a laminate. A sensor system records layup information about a layup of layers on a workpiece platform, wherein the layup of layers forms a workpiece. The sensor system records inspection information about the laminate on an inspection platform, wherein the laminate is formed from curing the workpiece. An analyzer of a computer system identifies a laminate nonconformance in the laminate using the inspection information. A user input verifying the laminate nonconformance in the laminate on the inspection platform is received by a user input system. A computer system trains an artificial intelligence system using the layup information, the inspection information, and the user input verifying the laminate nonconformance.

Another embodiment of the present disclosure provides a method for managing manufacturing of a laminate. A sensor system records layup information about a layup of layers on a workpiece platform, wherein the layup of layers forms a workpiece. The sensor system records inspection information about the laminate on an inspection platform, wherein the laminate is formed from curing the workpiece. An analyzer of a computer system identifies a laminate nonconformance in the laminate using the inspection information. The analyzer generates nonconformance information about the laminate nonconformance. A user input describing the laminate nonconformance in the laminate on the inspection platform is received by a user input system. The analyzer requests the user input to verify whether an identification of the laminate nonconformance in the laminate identified by the analyzer is correct when the identification of the laminate nonconformance in the laminate identified by the analyzer has a confidence level that is less than a threshold for proceeding without the user input.

Still another embodiment of the present disclosure provides a method for managing manufacturing of a laminate. A sensor system records layup information about a layup of layers on a workpiece platform, wherein the layup of layers forms a workpiece. The sensor system records inspection information about the laminate on an inspection platform, wherein the laminate is formed from curing the workpiece. An analyzer of a computer system identifies a laminate nonconformance in the laminate using the inspection information. The analyzer generates nonconformance information about the laminate nonconformance. A user input describing the laminate nonconformance in the laminate on the inspection platform is received by a user input system. The analyzer requests the user input to verify whether an identification of the laminate nonconformance in the laminate identified by the analyzer is correct based on a setting that indicates that an operator is to be prompted for a verification.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that analyzing nonconformances in laminates can affect the manner in which the layup of layers to form workpieces occur. For example, the illustrative embodiments recognize and take into account that at least one of a wrinkle in a layer, a foreign object, debris, material handling, a material issue, or other factor in laying layers can result in nonconformances in laminates.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The illustrative embodiments also recognize and take into account that the ability of human operators to consistently detect nonconformances is often not as great as desired. The illustrative embodiments recognize and take into account that nonconformances can be difficult to detect because of the size of nonconformances. Further, the illustrative embodiments recognize and take into account that with the repetitiveness and large number of laminates for inspection along with other duties, human operators may not always correctly identify nonconformances in laminates.

Thus, the illustrative embodiments provide a method, apparatus, and system for managing nonconformances in manufacturing laminates. In one illustrative example, a sensor system records layup information about a layup of layers on a tool on a workpiece platform. The layup of layers forms a workpiece. The sensor system records inspection information about a laminate on an inspection platform. The laminate is formed from curing the workpiece. A user input system receives a user input describing a nonconformance in the laminate on the inspection platform. A computer system trains an artificial intelligence system using the layup information, the inspection information, and the user input describing the nonconformance in the laminate.

Figure 1:
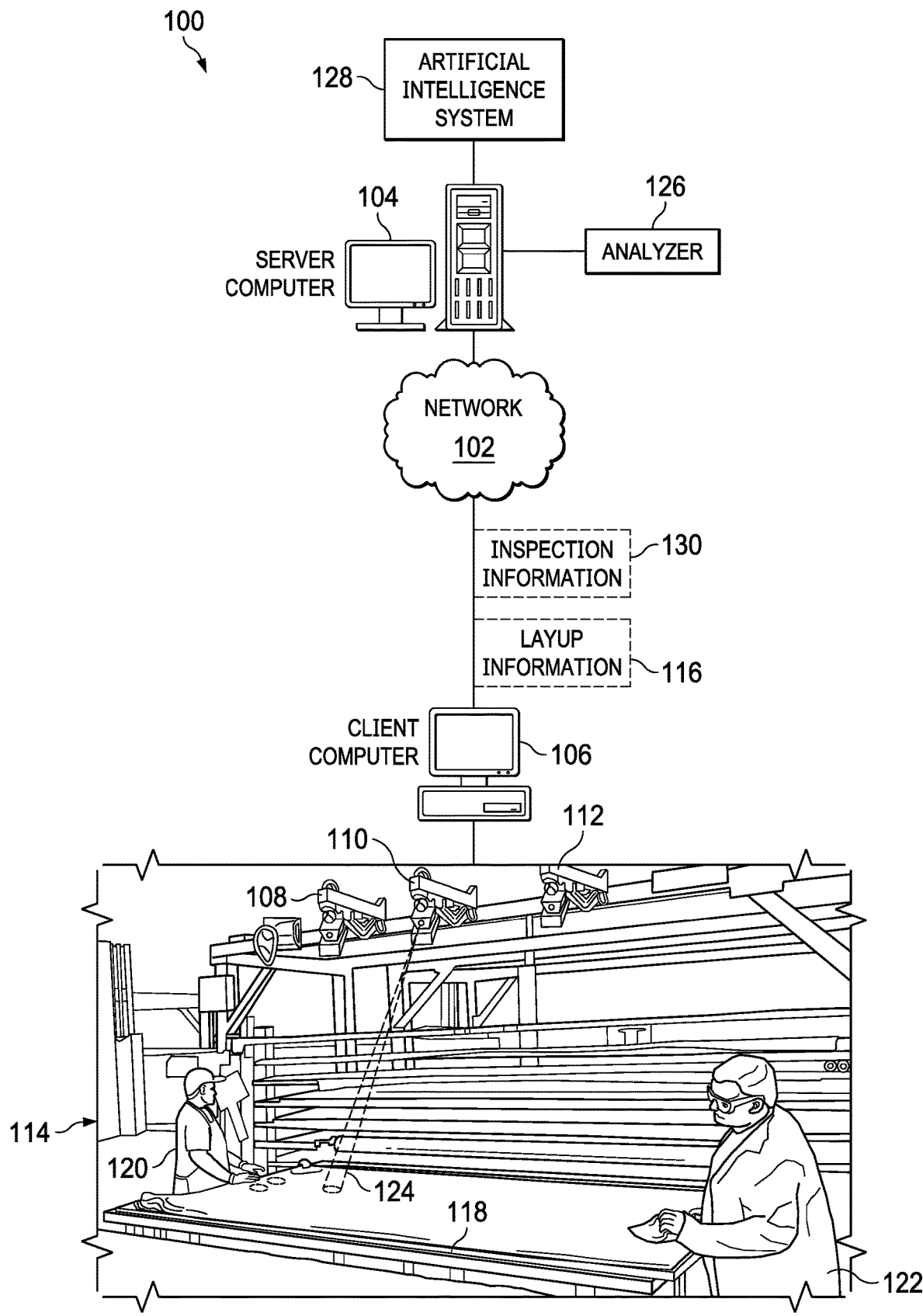
FIG. 1 is an illustration of a pictorial representation of a network of data processing systems and a build station in which illustrative embodiments may be implemented.

With reference now to the figures and, in particular, with reference to FIG. 1, an illustration of a pictorial representation of a network of data processing systems and a build station is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections such as wire, wireless communication links, or fiber optic cables.

In the depicted example, server computer 104 and client computer 106 are connected to network 102. In the depicted example, server computer 104 provides information, such as boot files, operating system images, and applications to client computer 106.

Program code located in network data processing system 100 can be stored on a computer-recordable storage medium and downloaded to a data processing system or other device for use. For example, program code can be stored on a computer-recordable storage medium on server computer 104 and downloaded to client computer 106 over network 102 for use on client computer 106.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks. In this depicted example, client computer 106 is in communication with a sensor system comprising camera 108, camera 110, and camera 112 at build station 114. With these components, client computer 106 can record layup information 116 about the layup of layers on a tool such as a metal caul plate on platform 118 in build station 114 to form workpieces. The forming of the workpieces can be performed by at least one of human operator 120 or human operator 122 at build station 114.

Additionally, client computer 106 is also in communication with a display system comprising laser projector 124 at build station 114. Laser projector 124 can display information to human operator 120 and human operator 122. In this illustrative example, laser projector 124 uses one or more lasers that are directed to and scan platform 118 or objects on platform 118 to display information. This information can include text, graphics, video, or other information that is visible to at least one of human operator 120 or human operator 122. This type of display can provide an augmented reality display to display information on a live view of the real-world environment such as platform 118 or objects on platform 118. The display can be such that information is seamlessly woven such that the information is perceived as part of platform 118 or objects on platform 118.

During a build operation at build station 114, layers of material are laid up on platform 118 to form one or more workpieces. During this build operation, human operator 120 can identify nonconformances in layers being laid up. Nonconformances in the layers can include at least one of a rip, a tear, a wrinkle, foreign debris, or other nonconformances.

In addition to identifying nonconformances, human operator 120 can indicate whether a particular nonconformance is acceptable or can be resolved. If the nonconformance cannot be resolved, the layer is scrapped.

In this illustrative example, client computer 106 projects a user interface directly onto a layer on platform 118 to allow human operator 120 to designate a precise location of where a nonconformance in a layer may be present. This nonconformance may be one that human operator 120 believes will not result in a nonconformance in the laminate. In this example, this designation is user input in the form of gestures which can be detected by at least one of camera 108, camera 110, or camera 112. The user input can be considered part of layup information 116. Layup information 116 can also include a video of the layup process or other information that can be detected by the campers.

Layup information 116 is sent to analyzer 126. Analyzer 126 can use layup information 116 to train artificial intelligence system 128. As artificial intelligence system 128 learns potential issues, artificial intelligence system 128 can communicate with client computer 106 to highlight areas of potential nonconformances directly on the layer laid up on platform 118 using laser projector 124 and allow human operator 120 to verify the presence of the nonconformance as well as other information about the nonconformance on the layer. This information forms additional information that can be used for further training of artificial intelligence system 128.

After the layers have been laid up to form workpieces, another metal caul plate can be placed on these workpieces to form a tray. The tray is moved to a press where pressure and heat are applied to cure the workpieces to form laminates. These laminates can be returned to platform 118 in build station 114 for inspection.

In this example, human operator 122 inspects the laminates for nonconformances. Human operator 122 generates user input that indicates the location of any nonconformances on the laminates. This information, along with a video or images of inspection from the cameras and other suitable information, forms inspection information 130. As depicted, inspection information 130 is sent to analyzer 126 running on server computer 104.

With inspection information 130 and layup information 116, analyzer 126 can use artificial intelligence system 128 to correlate nonconformances identified in a workpiece with a nonconformance in the laminate formed from curing the workpiece. In this manner, a prediction of when a nonconformance may occur can be made based on nonconformances identified in laying up layers for the workpiece. Further, verifications of predictions of nonconformances can be used in further training of artificial intelligence system 128 by analyzer 126.

As depicted, computer vision and gesture recognition processes can be implemented in at least one of analyzer 126 or artificial intelligence system 128. The processes can enable human operator 122 to generate user input detected by at least one of camera 108, camera 110, and camera 112. The user input specifies where on the laminate nonconformances exist and classifies the types of nonconformances. These processes can also receive user input about the disposition and state of the laminate. The state can be, for example, one of useable, rework, or scrap.

Further, analyzer 126 can also project patterns of laminate cutouts directly onto a laminate on platform 118 in build station 114 using laser projector 124. The patterns are potential patterns for cutting out parts from the laminate. In the illustrative example, analyzer 126 projects one pattern at a time onto the laminate.

Additionally, analyzer 126 can also project graphical indicators for nonconformances on the laminate using laser projector 124. For example, graphical indicators can be an outline of nonconformances, boundaries encompassing the nonconformances, or other types of graphical indicators that bring attention to the location of nonconformances on the laminates. This display of information is an augmented reality display that allows human operator 122 to visualize the pattern with respect to one or more nonconformances in a laminate.

Additionally, human operator 122 can also generate user input to reposition a pattern projected onto the laminate. Further, human operator 122 can view multiple patterns for the same or different parts to determine what pattern or patterns may be the most desirable pattern based on the nonconformance or nonconformances on the laminate. With the visualization of this information in the augmented reality display, human operator 120 can accept, reject, and reorient patterns and visualize these patterns in a laminate with the locations of nonconformances displayed on the laminate.

Further, user input can be used with inspection information 130 to train artificial intelligence system 128 using machine learning techniques. The training can enable artificial intelligence system 128 to recognize post-cure nonconformances. Inspection information 130 can include, for example, nonconformance classification, nonconformance location information, laminate part type, or pattern selection positioning.

Figure 2:
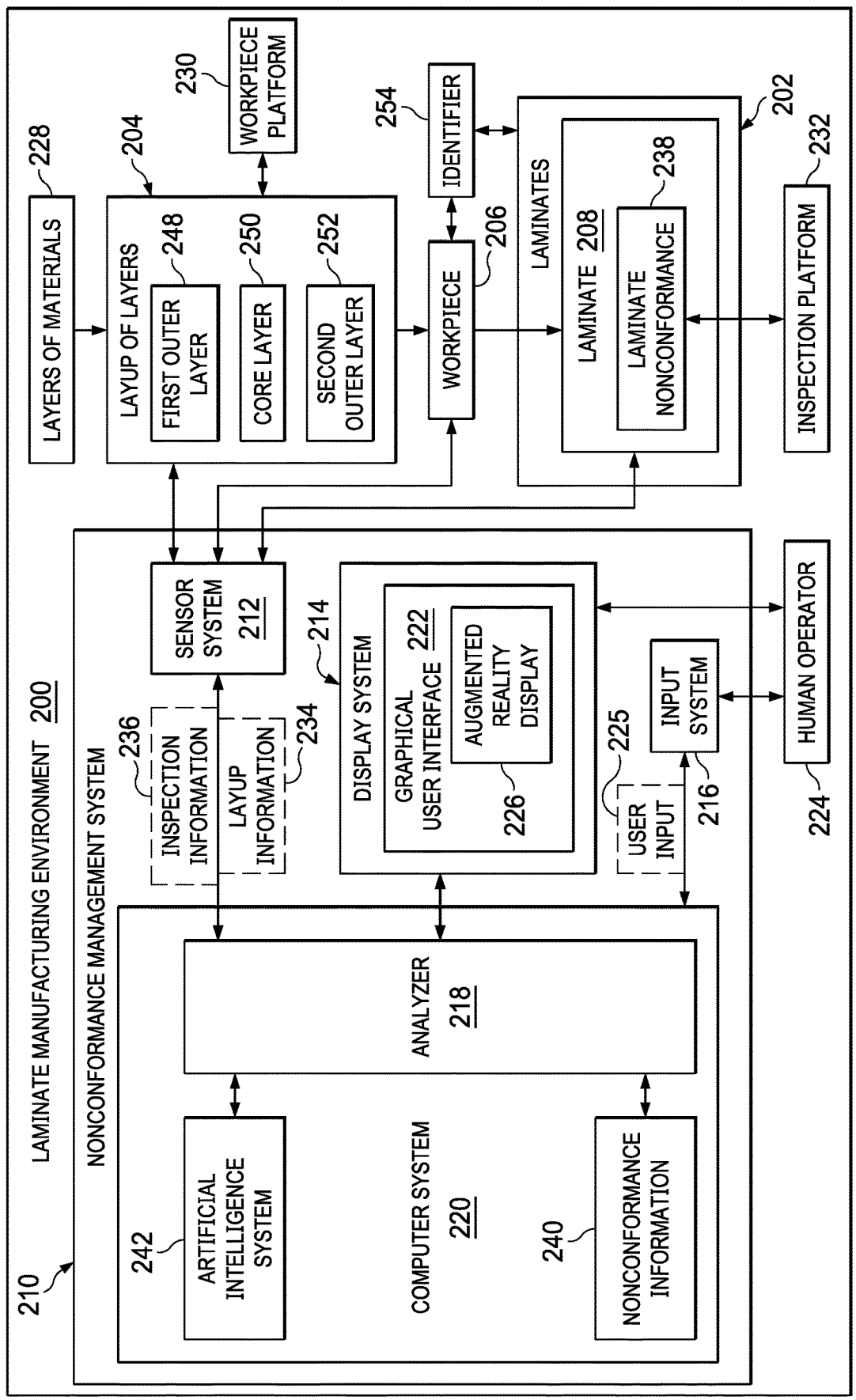
FIG. 2 is an illustration of a block diagram of a laminate manufacturing environment in accordance with an illustrative embodiment.

With reference next to FIG. 2, an illustration of a block diagram of a laminate manufacturing environment is depicted in accordance with an illustrative embodiment. In this illustrative example, laminate manufacturing environment 200 is an environment in which laminates 202 are manufactured.

For example, layup of layers 204 is laid up to form workpiece 206. Workpiece 206 is present when all of layers of materials 228 for laminate 208 are laid up on workpiece platform 230. Workpiece 206 is cured to form laminate 208 in laminates 202. The curing can occur using at least one of pressure or heat applied to workpiece 206.

In this illustrative example, layers of materials 228 in layup of layers 204 comprises first outer layer 248, core layer 250, and second outer layer 252. Core layer 250 is located between first outer layer 248 and second outer layer 252.

In one illustrative example, first outer layer 248 is selected from one of a thermoplastic layer and a polyvinyl fluoride layer. Second outer layer 252 is selected from one of the thermoplastic layer and the polyvinyl fluoride layer. Core layer 250 is selected from one of a resin layer, a carbon layer, and a honeycomb layer. Additionally, the layers in layup of layers 204 can also include at least one of a release sheet, a texture blanket, or a coating layer. Layers such as the release sheet and the texture blanket do not become part of laminate 208 but are used in forming laminate 208. In this example, a coating layer does become part of laminate 208. The coating layer can have a design or applique.

Identifier 254 can be used to correlate workpiece 206 with laminate 208. As depicted, identifier 254 is associated with workpiece 206. Identifier 254 is present in laminate 208 and identifies laminate 208 as being formed from workpiece 206. In this illustrative example, identifier 254 can be selected from at least one of a barcode, a radio frequency identifier, text, a visual code, or some other visual or machine-readable identifier.

As depicted, nonconformance management system 210 can be used to manage the allocation of laminates 202. In this illustrative example, nonconformance management system 210 includes a number of different components. As depicted in this example, nonconformance management system 210 includes sensor system 212, display system 214, input system 216, and analyzer 218. As depicted, analyzer 218 is located in computer system 220 in nonconformance management system 210.

As depicted, sensor system 212 is a physical hardware system that operates to detect operations, steps, and other actions performed for at least one of laying up layers of materials for layup of layers 204 that form workpiece 206 when layup of layers 204 is complete. Sensor system 212 can also detect laminate 208 on inspection platform 232. Laminate 208 results from curing workpiece 206.

In this illustrative example, sensor system 212 includes a number of different components. For example, sensor system 212 can include at least one of a camera, a visible light camera, an infrared camera, a laser scanner, or other suitable types of sensors.

Display system 214 is a physical hardware system and includes one or more display devices on which graphical user interface 222 can be displayed. The display devices may include at least one of a projector, a laser projector, smart glasses, a smart contact lens, a tablet computer, a mobile phone, a mobile computing device having a camera and a display device, or other suitable type of device that is capable of displaying information on a surface. Further, display system 214 can also include other display devices including at least one of a light emitting diode (LED) display, a liquid crystal display (LCD), an organic light emitting diode (OLED) display, a computer monitor, a flat panel display, a heads-up display (HUD), or some other suitable device that can output information for the presentation of information.

Display system 214 is configured to display graphical user interface 222 to human operator 224. In this illustrative example, graphical user interface 222 can take the form of augmented reality display 226. In augmented reality display 226, information is displayed directly on a live view in a manner that augments the live view of one or more objects.

In this illustrative example, information can be displayed on a live view of at least one of layup of layers 204, workpiece 206, laminate 208, workpiece platform 230, or inspection platform 232. In some illustrative examples, the live view can be one seen through smart glasses, a tablet, or a mobile phone. In another illustrative example, information can be displayed without the display device to view the object. For example, information can be displayed directly on the physical object itself using a projector, such as a laser projector.

Human operator 224 is a person that can interact with graphical user interface 222 through user input 225 generated by input system 216. Input system 216 is a physical hardware system and can be selected from at least one of a mouse, a keyboard, a gesture detection device, a camera, a virtual reality glove, a microphone, a gaze tracker, a motion detector, or some other suitable type of input device. In this illustrative example, when a camera is present in input system 216, the camera can also function as a sensor in sensors system 212. In other words, an overlap in functions for devices can be present.

In this illustrative example, human operator 224 places layers of materials 228 on workpiece platform 230 to create layup of layers 204. These layers can be sheets cut from rolls of materials. When complete, layup of layers 204 forms workpiece 206.

Workpiece platform 230 is a physical structure that supports layup of layers 204 laid up on workpiece platform 230 to form workpiece 206. Layup of layers 204 can be laid up on a tool on workpiece platform 230. This tool can be, for example, a metal caul plate, a contour layup tool, a fixture, a form, or some other suitable tool.

After workpiece 206 is cured to form laminate 208, laminate 208 can be placed on inspection platform 232. As depicted, inspection platform 232 is a physical structure that supports laminate 208 formed from workpiece 206. Workpiece platform 230 can be inspection platform 232. In other words, these two functional blocks can be implemented using the same physical structure.

In this illustrative example, sensor system 212 records at least one of layup information 234 about one of layup of layers 204 on workpiece platform 230 or inspection information 236 about laminate 208 located on inspection platform 232. In this depicted example, layup information 234 and inspection information 236 can include at least one of video, images, or audio about layup of layers 204 that form workpiece 206.

In some illustrative examples, layup information 234 can also include user input 225. When user input 225 is generated by input system 216, user input 225 can be sent to sensor system 212 for use in generating layup information 234. Additionally, user input 225 can be considered separate from layup information 234 and can be sent directly to analyzer 218 from input system 216. In other words, user input 225 can be part of layup information 234 or can be separate from layup information 234. Sensor system 212 sends layup information 234 and inspection information 236 to analyzer 218.

As depicted, analyzer 218 in computer system 220 identifies laminate nonconformance 238. Analyzer 218 can be implemented in software, hardware, firmware, or a combination thereof. When software is used, the operations performed by analyzer 218 can be implemented in program code configured to run on hardware, such as a processor unit. When firmware is used, the operations performed by analyzer 218 can be implemented in program code and data and stored in persistent memory to run on a processor unit. When hardware is employed, the hardware can include circuits that operate to perform the operations in analyzer 218.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 220 is a physical hardware system and includes one or more data processing systems. When more than one data processing system is present in computer system 220, those data processing systems are in communication with each other using a communications medium. The communications medium can be a network. The data processing systems can be selected from at least one of a computer, a server computer, a tablet computer, or some other suitable data processing system.

In this illustrative example, analyzer 218 can identify laminate nonconformance 238 in laminate 208 using inspection information 236 and generate nonconformance information 240 about laminate nonconformance 238. In some illustrative examples, analyzer 218 can identify laminate nonconformance 238 in laminate 208 using layup information 234 and inspection information 236. In this illustrative example, nonconformance information 240 describing laminate nonconformance 238 comprises at least one of a location, a region containing the nonconformance, a nonconformance type, a laminate status, a laminate part number, laminate constituent parts, or other suitable information that describes or is related to laminate nonconformance 238.

As depicted, the identification of laminate nonconformance 238 and the generation of nonconformance information 240 can be performed by artificial intelligence system 242. Artificial intelligence system 242 is a system that has intelligent behavior and can be based on a function of the human brain.

An artificial intelligence system comprises at least one of an artificial neural network, a cognitive system, a Bayesian network, fuzzy logic, an expert system, a natural language system, a cognitive system, or some other suitable system. Machine learning is used to train the artificial intelligence system. Machine learning involves inputting data to the process and allowing the process to adjust and improve the function of the artificial intelligence system.

A cognitive system is a computing system that mimics the function of a human brain. The cognitive system can be, for example, IBM Watson available from International Business Machines Corporation.

In the illustrative example, analyzer 218 displays nonconformance information 240 about the nonconformance in laminate 208 using display system 214 for augmented reality display 226. This display of nonconformance information 240 is on a live view of laminate 208. The live view can be used directly by human operator 224 without an intervening display device. This type of display can be performed using a projector such as a laser projector, a video projector, or a digital projector.

In another example, a camera can capture images of laminate 208. These images can be displayed on a display device with a live view of laminate 208 that is augmented with nonconformance information 240.

As depicted, analyzer 218 can request user input 225 to verify whether an identification of laminate nonconformance 238 in laminate 208 identified by analyzer 218 is correct based on a setting that indicates a human operator is to be prompted for the verification. This setting can be a default setting in which a verification is always requested or a setting selected by a user. The setting may be, for example, based on an event such as requesting a verification after every fifth laminate that is inspected.

In another example, the identification of laminate nonconformance 238 is made with a level of confidence. The level of confidence indicates how likely laminate nonconformance 238 is believed to be present.

As depicted, analyzer 218 requests user input 225 to verify whether an identification of laminate nonconformance 238 in laminate 208 identified by analyzer 218 is correct when the identification of laminate nonconformance 238 in laminate 208 identified by analyzer 218 has a confidence level that is less than a threshold for proceeding without user input 225. The threshold may be, for example, 88 percent, 95 percent, 98 percent, or some other level. The threshold can be selected, for example, using a specification or design rules.

In response to a request for verification by analyzer 218, human operator 224 generates user input 225 to verify whether laminate nonconformance 238 in laminate 208 identified by analyzer 218 is present.

Further, although the illustrative example is described in respect to processing layup of layers 204 to form laminate 208, nonconformance management system 210 can be used with laying layers for multiple workpieces. For example, eight workpieces, 10 workpieces, or 26 workpieces can be laid up on a first tool, such as a first metal caul plate, on workpiece platform 230. A second tool such as a second metal caul plate, can be placed on top of a stack of workpieces. This data can be referred to as a tray. The tray can be moved to a press that applies pressure and heat to the tray to form a stack of laminates.

The tray containing the laminates can then be moved to inspection platform 232. An inspection can be performed on the laminates by analyzer 218 using sensor system 212 to generate inspection information 236 for each of the laminates in the tray. Inspection information 236 can be analyzed using artificial intelligence system 242 to determine whether any inconsistencies are present in the stack of laminates.

Additionally, analyzer 218 can predict an occurrence of laminate nonconformance 238 for laminate 208 before layup of layers 204 are cured to form laminate 208 using layup information 234 recorded during the process of forming layup of layers 204. This prediction can be made by analyzer 218 using artificial intelligence system 242. As a result, layup of layers 204 may be reworked before being cured to form laminate 208. As a result, laminate nonconformance 238 predicted by analyzer 218 can be avoided. Thus, a lower occurrence of inconsistencies in laminates 202 can occur through predictive identifications of nonconformances by artificial intelligence system 242.

Figure 3:
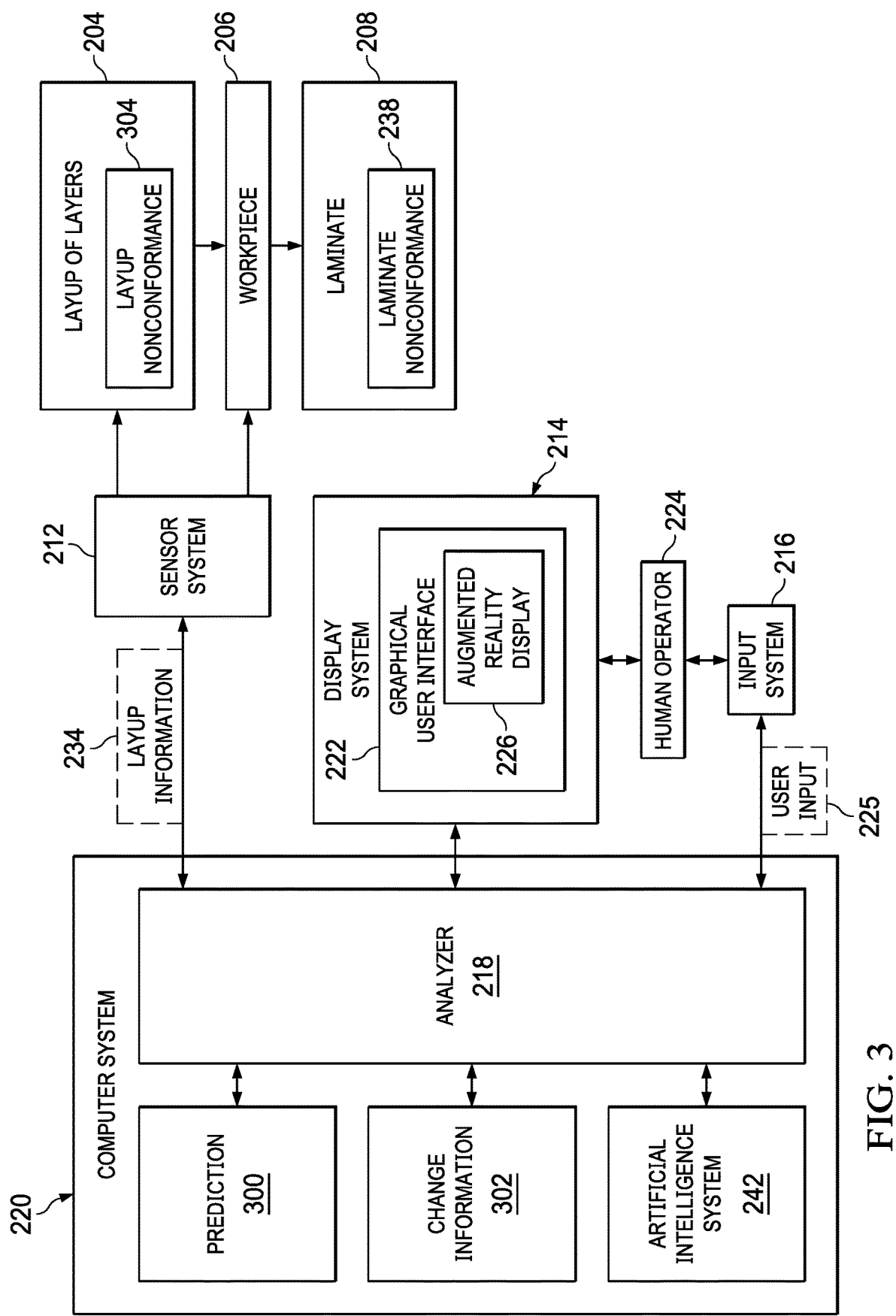
FIG. 3 is an illustration of a dataflow for predicting a nonconformance in accordance with an illustrative embodiment.

With reference next to FIG. 3, an illustration of a dataflow for predicting a nonconformance is depicted in accordance with an illustrative embodiment. In the illustrative examples, the same reference numeral may be used in more than one figure. This reuse of a reference numeral in different figures represents the same element in the different figures.

In this illustrative example, analyzer 218 in computer system 220 uses artificial intelligence system 242 to predict the presence of laminate nonconformance 238 in laminate 208. As depicted, sensor system 212 records layup information 234 from laying up layers in layup of layers 204 to form workpiece 206 which is in turn cured to form laminate 208.

Analyzer 218 can generate prediction 300 for laminate nonconformance 238 occurring in laminate 208 based on layup information 234 for layup of layers 204. In this illustrative example, layup information 234 can be generated continuously as layers in layup of layers 204 are placed to form workpiece 206. Layup information 234 can be sent as generated, periodically, when layup of layers 204 is complete, or some combination thereof.

In the illustrative example, layup information 234 includes images or video of layers within layup of layers 204. This information can be present for each layer placed to form layup of layers 204. The information can be analyzed to identify layup nonconformance 304 within layup of layers 204 for workpiece 206, prior to workpiece 206 being cured to form laminate 208. Layup nonconformance 304 can include at least one of a wrinkle in a layer, foreign object debris, a missing alignment of a layer, or some other nonconformance.

As depicted, prediction 300 is generated prior to curing workpiece 206 to form laminate 208. Prediction 300 can include the probability that laminate nonconformance 238 occurs in laminate 208. In some cases, the presence of layup nonconformance 304 will not result in laminate nonconformance 238 in laminate 208.

Further, analyzer 218 can also generate change information 302 indicating a change in layup of layers 204 that reduces a probability that laminate nonconformance 238 will be present when layup of layers 204 is cured to form laminate 208. In this example, prediction 300 and change information 302 are generated by analyzer 218 using artificial intelligence system 242.

Analyzer 218 displays change information 302 indicating the change in layup of layers 204 on a live view of layup of layers 204 using display system 214 for augmented reality display 226. In this illustrative example, change information 302 can include instructions to resolve layup nonconformance 304 in layup of layers 204 such that the probability that laminate nonconformance 238 will be present when layup of layers 204 is cured to form laminate 208 is reduced.

Further, the identification of layup nonconformance 304 can be used by human operator 224 to make a change in layup of layers 204 to reduce the probability that laminate nonconformance 238 will occur in laminate 208. Change information 302 can include at least one of a layup nonconformance type for a layup nonconformance, a location in the layup of layers containing the layup nonconformance, or an instruction to resolve the layup nonconformance.

Figure 4:
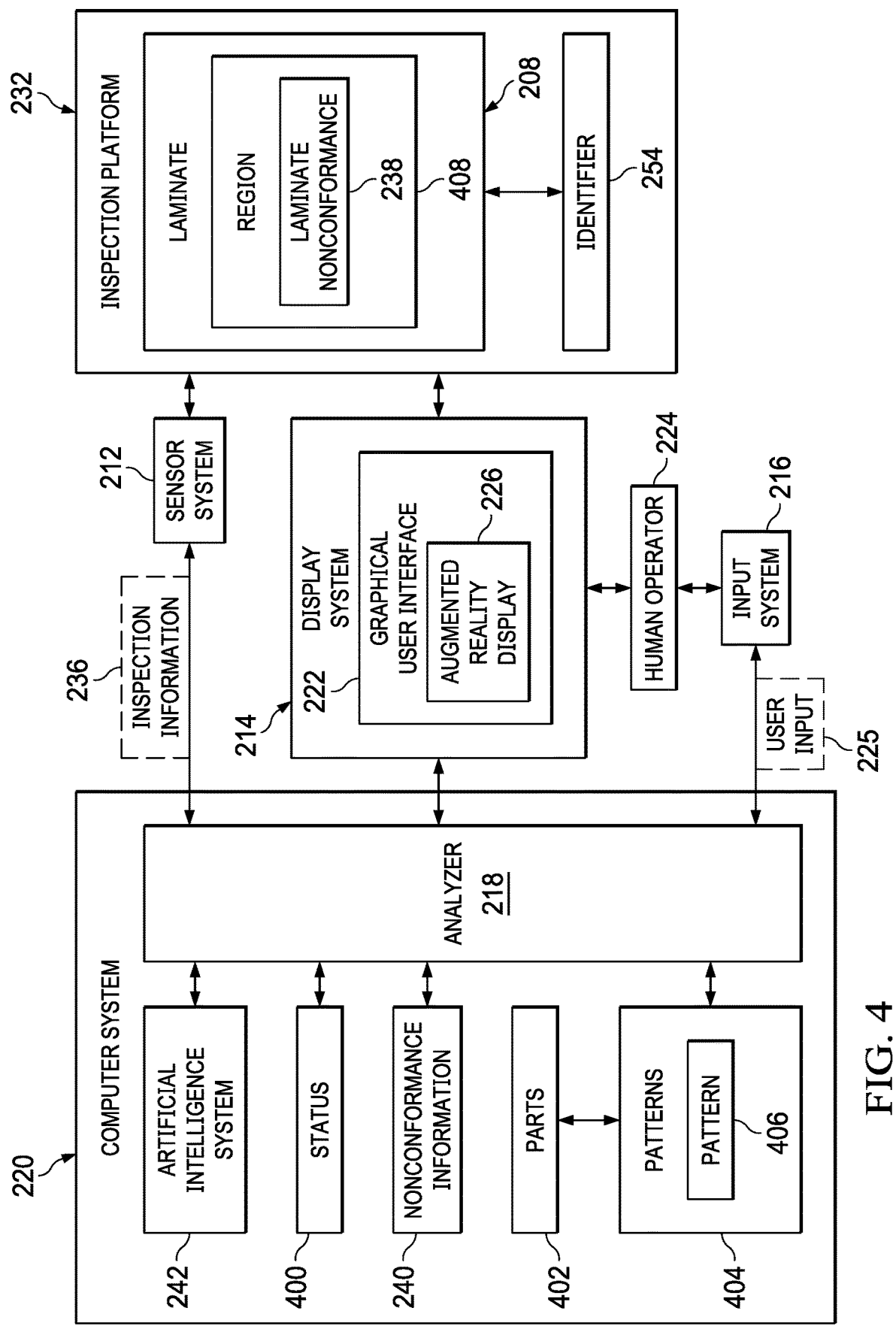
FIG. 4 is an illustration of a dataflow for managing a nonconformance in a laminate in accordance with an illustrative embodiment.

With reference now to FIG. 4, an illustration of a dataflow for managing a nonconformance in a laminate is depicted in accordance with an illustrative embodiment. In this illustrative example, laminate 208 is placed on inspection platform 232. Sensor system 212 generates inspection information 236 about laminate 208. Analyzer 218 identifies laminate nonconformance 238 has been identified as being present using inspection information 236.

As depicted, status 400 is determined for laminate 208. Status 400 can be, for example, acceptable, rework, or discard in this particular example. Additionally, status 400 can include laminate yield, which can be based on width, fixed length, and material type in this example.

Part of determining status 400 can be whether laminate nonconformance 238 in laminate 208 affects a set of parts 402 that can be formed from laminate 208. This determination can be made by examining patterns 404. The set of parts 402 is identified using nonconformance information 240 about laminate nonconformance 238. As depicted, nonconformance information 240 describing laminate nonconformance 238 comprises at least one of a location, a region containing the nonconformance, a nonconformance type, a laminate status, a laminate part number, laminate constituent parts, or other suitable information that describes or is related to laminate nonconformance 238.

In this illustrative example, the part type of parts 402 can be based on the materials in laminate 208. This part type can be obtained from an identifier, such as identifier 254, which may take the form of a barcode, a radio frequency identifier (RFID) chip, a graphic, text, or some other suitable type of item that can be placed on or in workpiece 206 that remains in place when laminate 208 is formed.

In this example, a location of laminate nonconformance 238 and a region or extent of laminate nonconformance 238 can be used to determine whether laminate 208 can be used to fabricate the set of parts 402. In this illustrative example, analyzer 218 can display pattern 406 for the set of parts 402 onto laminate 208. Further, analyzer 218 can also display region 408 at the location of laminate nonconformance 238.

In one illustrative example, human operator 224 can view pattern 406 with respect to region 408 encompassing laminate nonconformance 238 as part of augmented reality display 226. A visual inspection can be made by human operator 224 to determine whether laminate 208 is usable for the set of parts 402 in pattern 406. If region 408 is within the cutout in pattern 406 for a part in the set of parts 402, human operator 224 can change the orientation of pattern 406 to determine whether the change in pattern results in laminate 208 being usable for fabricating the set of parts 402 using pattern 406.

If laminate 208 is not suitable for use in fabricating the set of parts 402 using pattern 406, another pattern in patterns 404 can be displayed on laminate 208. The different pattern may have at least one of a different orientation or spacing of parts for the same part as pattern 406. The other pattern may have different types of parts that may be more suitable for fabricating those parts.

The process can also be performed by artificial intelligence system 242. The selected pattern in patterns 404 and the orientation enables laminate 208 to be displayed on laminate 208 in augmented reality display 226 to human operator 224. Human operator 224 can generate user input 225 to verify that the selection is correct or to select a different pattern. Further, if more than one pattern is identified in patterns 404 as being usable to form laminate 208, those options can also be displayed to human operator 224 for selecting the appropriate pattern for laminate 208.

Figure 5:
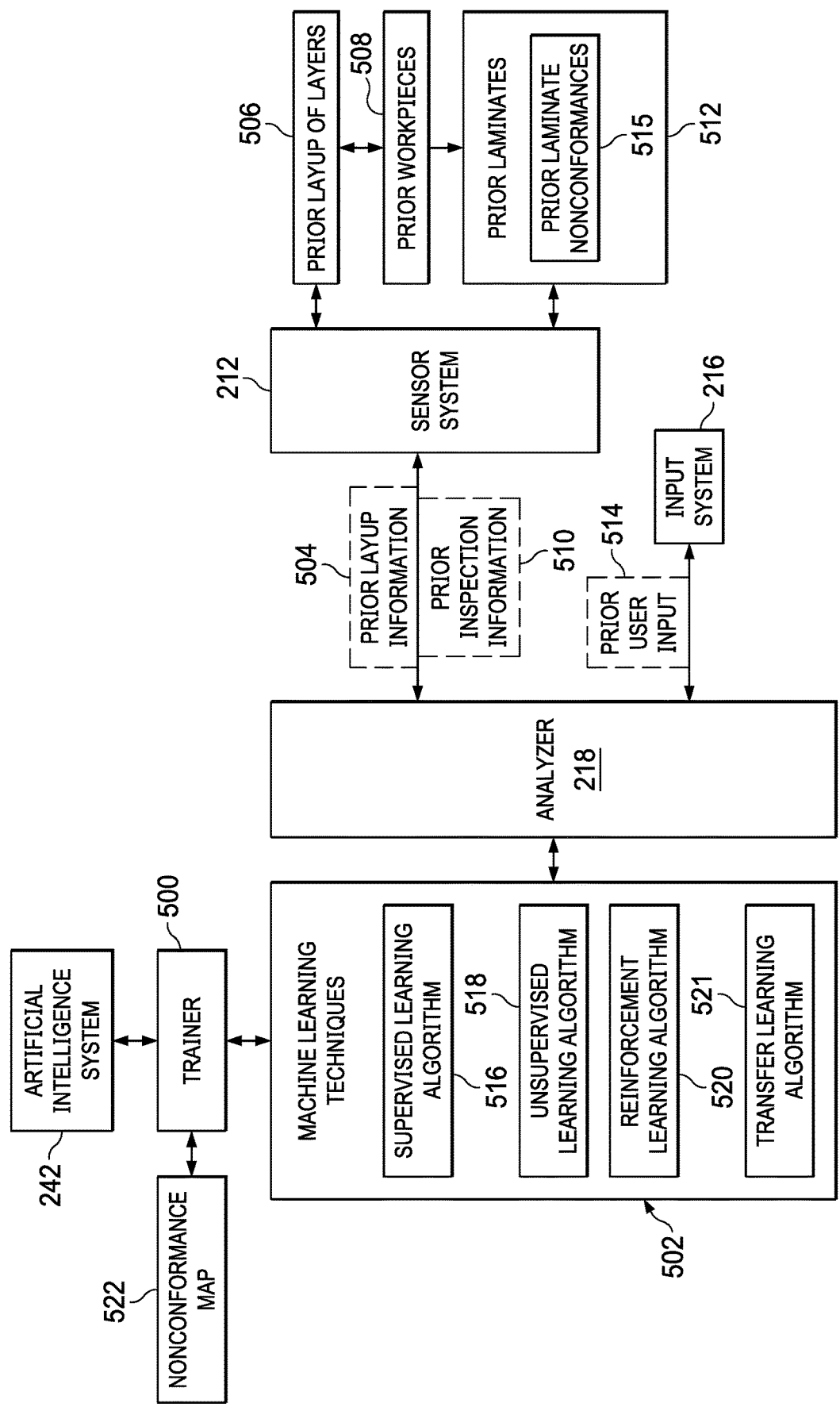
FIG. 5 is an illustration of a dataflow for training an artificial intelligence system to manage laminate nonconformances in laminates in accordance with an illustrative embodiment.

With reference now to FIG. 5, an illustration of a dataflow for training an artificial intelligence system to manage laminate nonconformances in laminates is depicted in accordance with an illustrative embodiment. In this illustrative example, trainer 500 is operated to train artificial intelligence system 242.

As depicted, trainer 500 can implement machine learning techniques 502 to train artificial intelligence system 242. The training of artificial intelligence system 242 can be performed using prior layup information 504 recorded for prior layup of layers 506 for prior workpieces 508, prior inspection information 510 about prior laminates 512 formed from prior workpieces 508, and prior user input 514 identifying prior laminate nonconformances 515 in prior laminates 512.

For example, trainer 500 can train artificial intelligence system 242 using sensor system 212 that records prior layup information 504 for prior workpieces 508 and prior inspection information 510 about prior laminates 512 formed from prior workpieces 508. Additionally, the training can also be performed using prior user input 514 identifying prior laminate nonconformances 515 in prior laminates 512 that are received from input system 216.

This training can be performed using machine learning techniques 502 to enable artificial intelligence system 242 to identify laminate nonconformance 238 in laminate 208. This information forms the data or data sets that are used by trainer 500 to train artificial intelligence system 242.

With respect to training artificial intelligence system 242 using machine learning techniques 502, trainer 500 can include one or more categories of machine learning techniques 502 for training artificial intelligence system models for artificial intelligence system 242. Artificial intelligence system 242 includes one or more artificial intelligence system models which are trained to perform different tasks such as detecting nonconformances, predicting nonconformances, determining whether laminates can be used when nonconformances are present in the laminates, as well as other tasks.

In this illustrative example, these categories are supervised learning algorithm 516, unsupervised learning algorithm 518, reinforcement learning algorithm 520, and transfer learning algorithm 521. As depicted, artificial intelligence system 242 can be trained using at least one of supervised learning algorithm 516, unsupervised learning algorithm 518, reinforcement learning algorithm 520, or transfer learning algorithm 521.

In the illustrated example, supervised learning algorithm 516 comprises providing artificial intelligence system 242 with training data and the correct output value of the data. During supervised learning, the values for the output are provided along with the training data (labeled dataset) for the model building process. The algorithm, through trial and error, deciphers the patterns that exist between the input training data and the known output values to create a model that can reproduce the same underlying rules with new data. This model is a component in artificial intelligence system 242. Examples of supervised learning algorithms include regression analysis, decision trees, k-nearest neighbors, neural networks, and support vector machines.

If unsupervised learning algorithm 518 is used, not all of the variables and data patterns are labeled, forcing the artificial intelligence machine model in artificial intelligence system 242 to discover hidden patterns and create labels on its own through the use of unsupervised learning algorithm 518. Unsupervised learning algorithm 518 has the advantage of discovering patterns in the data with no need for labeled datasets. Examples of unsupervised learning algorithms used in unsupervised machine learning to train artificial intelligence system 242 include k-means clustering, association analysis, and descending clustering.

Whereas supervised learning algorithm 516 and unsupervised learning algorithm 518 cause the artificial intelligence model in artificial intelligence system 242 to learn from a dataset, reinforcement learning algorithm 520 results in the artificial intelligence model in artificial intelligence system 242 learning from interactions with an environment. This environment can be detected through sensor system 212 and input system 216. Reinforcement learning algorithm 520 can be, for example, Q-learning, which is used to train the artificial intelligence model in artificial intelligence system 242 through interacting with the environment using measurable performance criteria.

In this illustrative example, transfer learning algorithm 521 is another machine learning technique that can be used to train artificial intelligence system 242. This particular machine learning technique can be used to use a pre-existing artificial intelligence system that has been pre-trained with a data set for a different purpose. In other words, artificial intelligence system 214 can be a pre-existing artificial intelligence system that has been trained to extract features from images for a different purpose. For example, artificial intelligence system 242 can already be trained to extract features and classify those features to identify tools in the images. With transfer learning algorithm 521, artificial intelligence system 242 can be modified or provided with new rules to perform classification to identify nonconformances. In this manner, the training enables artificial intelligence system 242 to extract features that have already been performed before using transfer learning algorithm 521. The training using transfer learning algorithm 521 can take advantage of the fact that artificial intelligence system 242 can be trained to extract features. The training focuses on classification to identify nonconformances.

Additionally, reinforcement or additional training can occur even after artificial intelligence system 242 is operating to detect nonconformances, predict nonconformances, or determine whether laminates with nonconformances can be used. For example, the process of laying up layers of material for layup of layers 204 to form workpiece 206 can be recorded in sensor system 212. Further, the identification of layup nonconformances in layup of layers 204 can also be identified in user input 225.

At this point in time, human operator 224 generate user input 225 to identify layup nonconformances seen by human operator 224 during the layup of each layer in layup of layers 204. The user input can also indicate whether the particular nonconformance would cause a laminate nonconformance in the laminate resulting from curing the layup of layers. Further, the identification of laminate nonconformances can be in user input 225 generated by human operator 224 when inspecting laminate 208. In other words, human operator 224 through gestures can indicate where a particular laminate nonconformance is present.

Human operator 224 can also verify the extent of the laminate nonconformance, nonconformance type, and other information about the laminate nonconformance. Sensor system 212 can record video or images of the laminate inspected by human operator 224. User input 225 and inspection information 236 are used to train artificial intelligence system 242. This verification of whether a laminate nonconformance 238 is present in user input 225 and inspection information 236 can be used by trainer 500 to further train artificial intelligence system 242.

In some illustrative examples, the training also may include using layup information 234. Layup information 234 may be used in training artificial intelligence system 242 to identify when particular layup nonconformances in layers in layup of layers 204 results in laminate nonconformance 238 in laminate 208. This additional training can increase the accuracy at which artificial intelligence system 242 identifies laminate nonconformances.

Further, when the training also includes layup information 234 in addition to inspection information 236, analyzer 218 using artificial intelligence system 242 can operate to predict when a laminate nonconformance may occur.

Further, a root cause analysis of prior layup of layers 506 for prior workpieces 508 that were cured to form prior laminates 512 can be performed. This analysis can be performed to generate nonconformance map 522. Nonconformance map 522 is information that can be used by trainer 500 to train artificial intelligence system 242 to predict the occurrence of laminate nonconformances based on layup information.

Nonconformance map 522 identifies the occurrence of laminate nonconformances based on layup nonconformances. The layup nonconformances in nonconformance map 522 can include at least one of a wrinkle, a crease, a dent, a washout, an incorrect layup of layers, a contaminant, dirt, debris, or other nonconformances occurring during the layup of layers for workpieces.

In one illustrative example, one or more technical solutions are present that overcome a technical problem with accurately identifying nonconformances in laminates using current techniques in which human operators perform inspections of laminates. As a result, one or more technical solutions can provide a technical effect enabling a computer system to automatically inspect laminates for nonconformances, predict the occurrence of nonconformances during the layup of layers for workpieces cured to form laminates, display change instructions during the layup process to reduce nonconformances in laminates, or reduce the discarding of laminates through pattern selection for parts.

Thus, the illustrative examples provide a method, an apparatus, and a system for managing the manufacturing of laminates. Nonconformance management system 210 operates to reduce nonconformances in laminates. Further, the system can also operate to perform root cause analysis to identify causes of nonconformances occurring prior to a workpiece comprising a layup of layers being cured to form the laminate. Further, nonconformance management system 210 can be used to perform part selection for a laminate when a nonconformance is present in a laminate.

Nonconformance management system 210 can employ graphical user interface 222 in the form of augmented reality display 226 that is displayed directly on laminate 208. Additionally, artificial intelligence system 242 and nonconformance management system 210 can be trained to identify laminate nonconformances that can be verified by human operator 224. Further, artificial intelligence system 242 can operate to predict causes of laminate nonconformances and display change information 302 that can be used to reduce the occurrence of laminate nonconformances prior to curing workpieces.

Computer system 220 can be configured to perform at least one of the steps, operations, or actions described in the different illustrative examples using software, hardware, firmware, or a combination thereof. As a result, computer system 220 operates as a special purpose computer system in which analyzer 218 in computer system 220 enables at least one of managing the manufacture of laminates during at least one of placing layers of material to form a layup of layers to form a workpiece, more accurately identifying nonconformances during inspection of laminates, or selecting patterns for parts when nonconformances are present in laminates. In particular, analyzer 218 transforms computer system 220 into a special purpose computer system as compared to currently available general computer systems that do not have analyzer 218. In the illustrative examples, analyzer 218 includes a practical application of artificial intelligence system 242.

In the illustrative example, the use of analyzer 218 in computer system 220 integrates processes into a practical application for managing the manufacturing of laminates that increases the performance of computer system 220. In other words, analyzer 218 in computer system 220 is directed to a practical application of processes integrated into analyzer 218 in computer system 220 that identifies nonconformances in a laminate from inspection information detected by a sensor system in which inspection information is processed using artificial intelligence system 242. In this manner, through training, analyzer 218 can use artificial intelligence system 242 in a manner that is improved as compared to current techniques in which human operators perform various operations.

The illustration of laminate manufacturing environment 200 in the different components in FIGS. 2-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, workpiece platform 230 and inspection platform 232 may also be considered part of nonconformance management system 210 in some illustrative examples. In another illustrative example, artificial intelligence system 242 can be part of analyzer 218 instead of being separate components. In yet another illustrative example, videos in layup information 234 containing correct procedures for reducing the occurrence of layup nonconformances that results in laminate nonconformances can be presented to human operators. These videos can be presented as part of change information 302 when a layup nonconformance is identified in a layer of material being laid up in a layup of layers that form a workpiece. In another illustrative example, these videos can be used as part of a separate training processor class for human operators.

Figure 6:
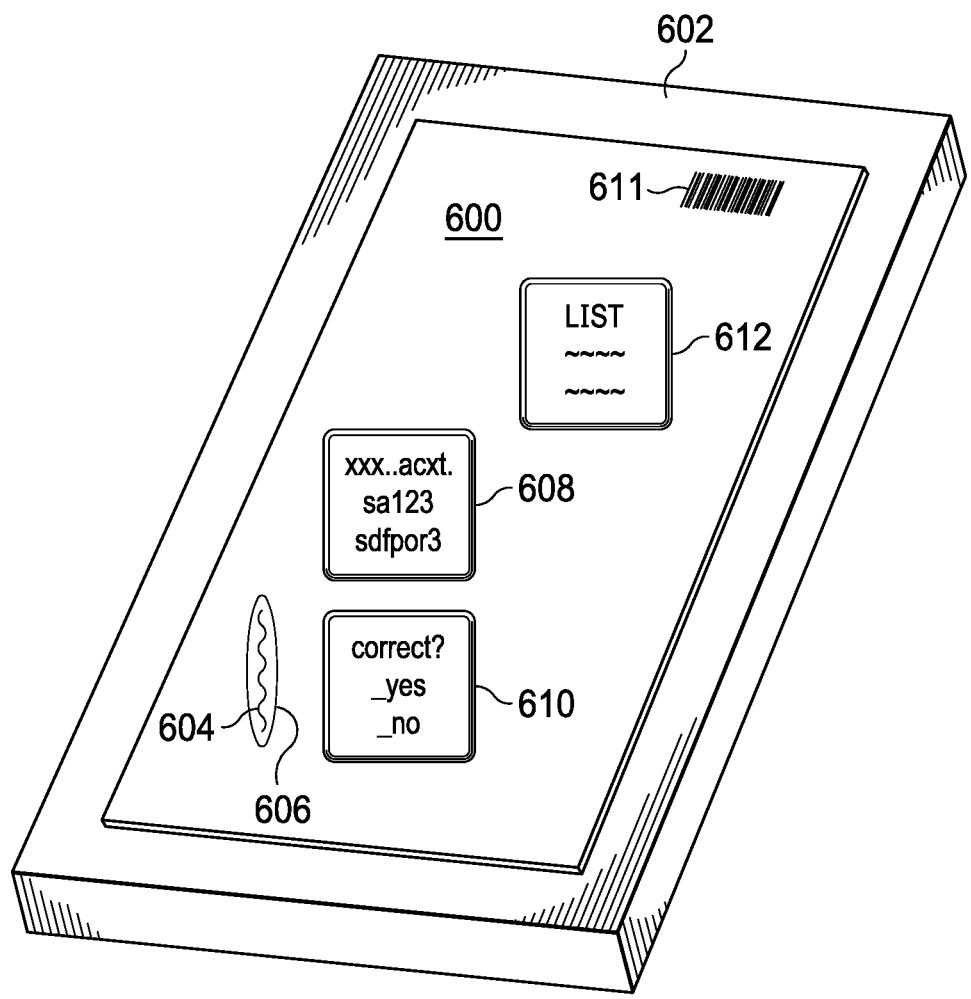
FIG. 6 is an illustration of an augmented reality display of nonconformance information on a laminate in accordance with an illustrative embodiment.

With reference next to FIG. 6, an illustration of an augmented reality display of nonconformance information on a laminate is depicted in accordance with an illustrative embodiment. As depicted in this example, laminate 600 is located on inspection platform 602. Laminate 600 is an example of one physical implementation for laminate 208 shown in block form in FIG. 2. Inspection platform 602 is an example of one physical implementation for inspection platform 232 shown in block form in FIG. 2.

In this illustrative example, laminate nonconformance 604 is present in laminate 600. In this example, laminate nonconformance 604 is a wrinkle in laminate 600. Laminate nonconformance 604 is an example of laminate nonconformance 238 shown in block form in FIG. 2.

As depicted, region 606 is displayed on laminate 600 around laminate nonconformance 604. The display of region 606 is performed using a laser projector. Further, nonconformance information 608 is displayed on laminate 600. Nonconformance information 608 is an example of nonconformance information 240 shown in block form in FIG. 2.

As depicted, nonconformance information 608 can include at least one of nonconformance type, correlated information identifying the location of laminate nonconformance 604, a laminate part number, laminate materials, or other suitable information relating to laminate nonconformance 604.

In this illustrative example, laminate materials, laminate part number, and other suitable information can be identified in a number of different ways. For example, barcode 611 is located on laminate 600 in this example. Barcode 611 can be used to identify the layers, materials for layers, such as raw materials used to form the layers, and other information about the layup of layers used to form the workpiece cured to form laminate 600.

Further, verification prompt 610 is also displayed on laminate 600. This prompt requests user input to indicate whether the identification of laminate nonconformance 604 is correct. As depicted, the display is performed by overlaying information on a live view of laminate 600 to provide an augmented reality display to the human operator. In this example, the user can request an analyzer for correction/clarification and verification of the identified nonconformance, part layout selection, or some combination thereof.

Further, list of nonconformances 612 can be displayed on laminate 600. List of nonconformance 612 are nonconformances identified as being potential candidates for laminate nonconformance 604. This list can be displayed as part of training the artificial intelligence system. For example, if the artificial intelligence system is unsure as to the presence of a particular nonconformance, the artificial intelligence system can display these options in list of nonconformances 612. This list can be displayed in place of or in addition to verification prompt 610.

Figure 7:
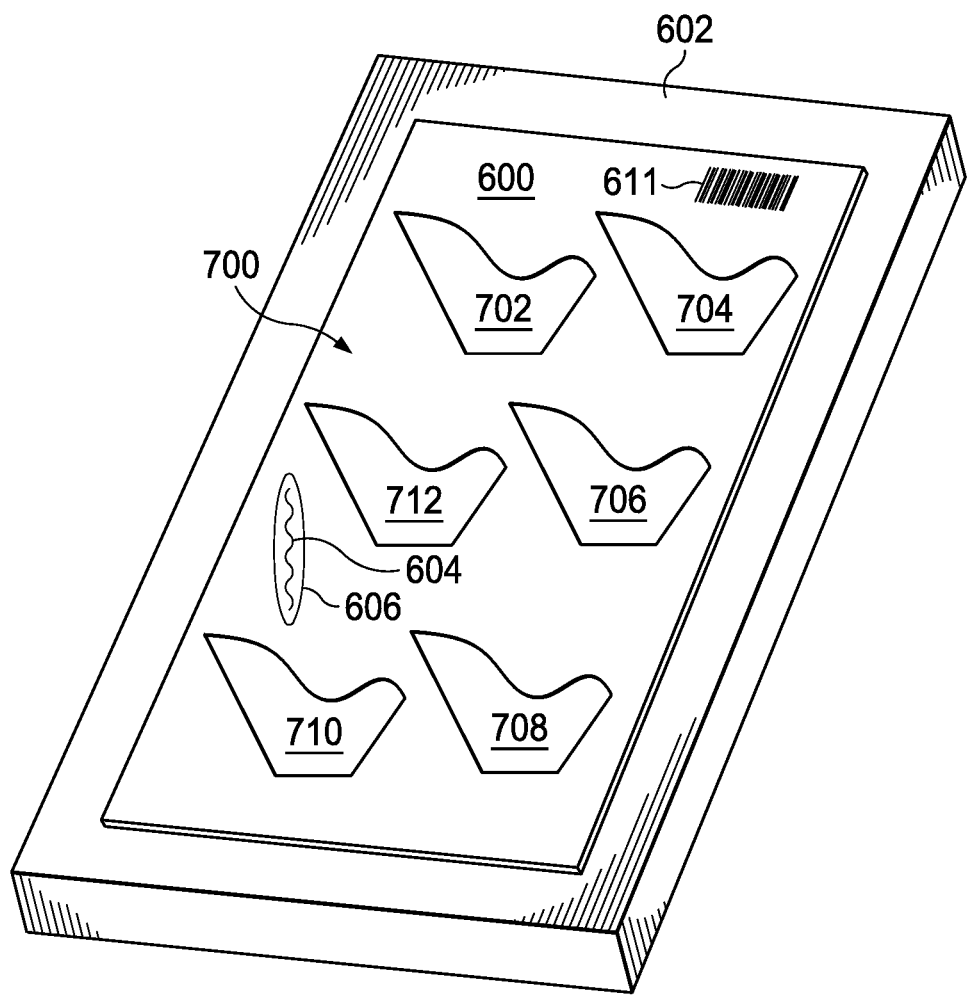
FIG. 7 is an illustration of a display of a pattern on a laminate in accordance with an illustrative embodiment.

With reference next to FIG. 7, an illustration of a display of a pattern on a laminate is depicted in accordance with an illustrative embodiment. In this depicted example, pattern 700 is displayed on laminate 600 by a laser projector. Pattern 700 is an example of pattern 406 shown in block form in FIG. 4.

As depicted, Pattern 700 identifies cutouts for parts. In this example, the cutouts include cutout 702, cutout 704, cutout 706, cutout 708, cutout 710, and cutout 712. A cutout is a portion of laminate 600 that is removed from laminate 600 to form a part.

As depicted, laminate nonconformance 604 does not interfere with cutting up laminate 600 to obtain cutouts for parts, as shown by the overlay of pattern 700 onto laminate 600. If laminate nonconformance 604 was located within a cutout part, pattern 700 can be reoriented or another pattern for another type of part could be selected and displayed on laminate 600 to determine whether laminate 600 is usable. When, laminate nonconformance 604 is located within a cutout or multiple cutouts for pattern 700, laminate 600 can be used to fabricate parts with fewer parts being fabricated from laminate 600.

Figure 8:
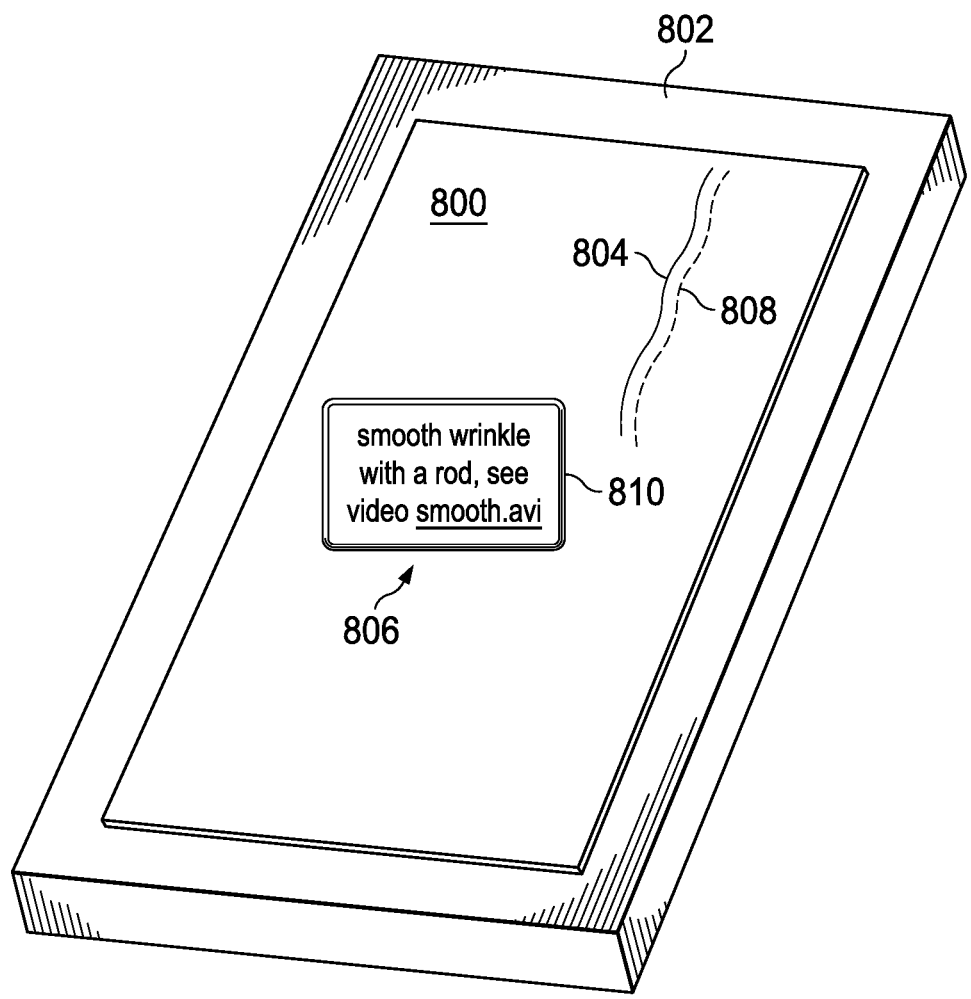
FIG. 8 is an illustration of a display of change information for a layer of material in a workpiece in accordance with an illustrative embodiment.

With reference next to FIG. 8, an illustration of a display of change information for a layer of material in a workpiece is depicted in accordance with an illustrative embodiment. In this illustrative example, layer of material 800 is laid up on layup platform 802.

In this example, layup nonconformance 804 is present in layer of material 800. In this example, layup nonconformance 804 is a wrinkle in layer of material 800. As depicted, layup nonconformance 804 is predicted to cause a nonconformance in the laminate that is created from layer of material 800. In this example, change information 806 is displayed directly on layer of material 800 with a laser projector.

As depicted, change information 806 includes graphical indicator 808 identifying the outline of layup nonconformance 804. Additionally, change information 806 also includes instructions 810. In this example, instructions 810 are to smooth the wrinkle with a rod and also see a video showing the technique to smooth wrinkles.

Figure 9:
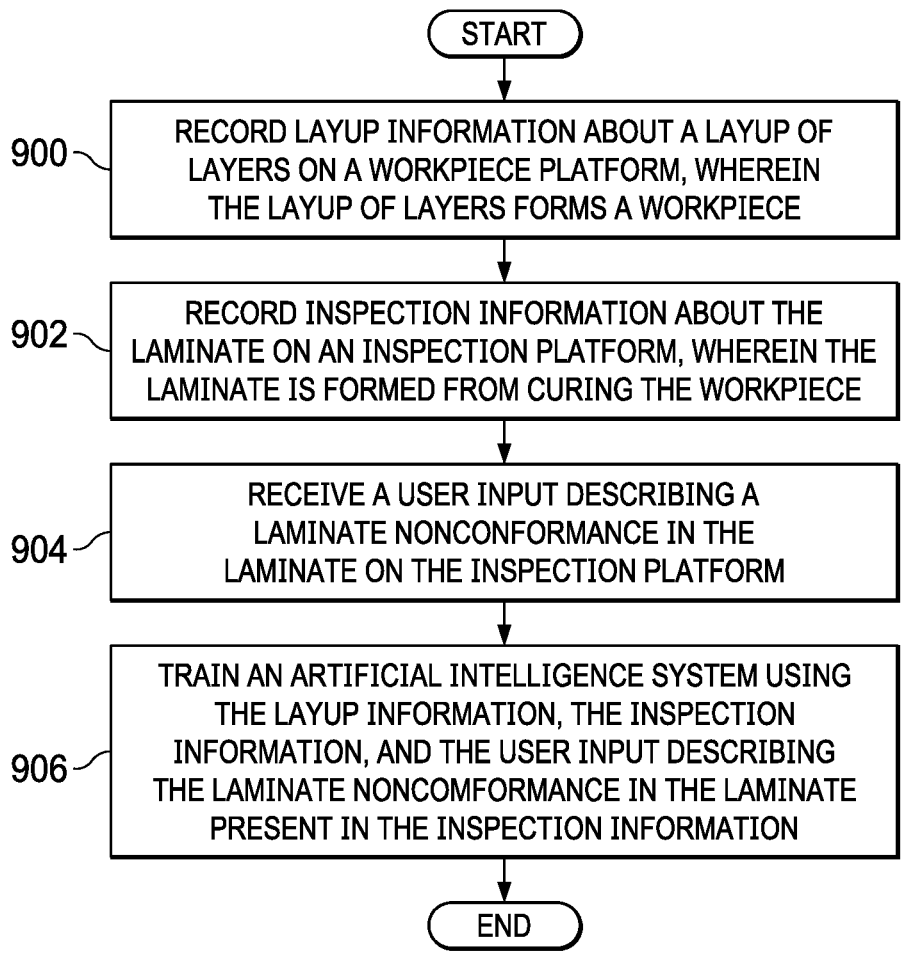
FIG. 9 is an illustration of a flowchart of a process for managing manufacturing of a laminate in accordance with an illustrative embodiment.

Turning next to FIG. 9, an illustration of a flowchart of a process for managing manufacturing of a laminate is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented in analyzer 218 in computer system 220 in FIG. 2.

The process begins by recording layup information about a layup of layers on a workpiece platform, wherein the layup of layers forms a workpiece (operation 900). The layup information is recorded by a sensor system, such as sensor system 212 shown in block form in FIG. 2. The process records inspection information about the laminate on an inspection platform, wherein the laminate is formed from curing the workpiece (operation 902). In operation 902, the inspection information is also reported by sensor system 212. The layup information and inspection information can include at least one of video, images, audio, user input, or other suitable information.

The process receives a user input describing a laminate nonconformance in the laminate on the inspection platform (operation 904). The user input is received from a user input system. The description of the laminate nonconformance in the user input can include at least one of a location of the laminate nonconformance, a region containing the laminate nonconformance, a nonconformance type, a laminate status, or other suitable information that can be input by a human operator inspecting the laminate.

In operation 904, the user input can be made through gestures detected by a camera, a keyboard, a virtual reality glove, a microphone, or other suitable types of input devices. For example, the location of the laminate nonconformance can be made by the user employing gestures pointing to the location of the laminate nonconformance. In similar fashion, user input can be gestures that outline or define a region in which the laminate nonconformance is present.

The process trains an artificial intelligence system using the layup information, the inspection information, and the user input describing the laminate nonconformance in the laminate present in the inspection information (operation 906). The process terminates thereafter. The training of the artificial intelligence system in operation 906 can be performed using trainer 500 employing one or more of machine learning techniques 502 in FIG. 5.

The training can result in one or more artificial intelligence system models for the artificial intelligence system. These models can be continued training to increase at least one of speed and accuracy of nonconformances identified or predicted.

Figure 10:
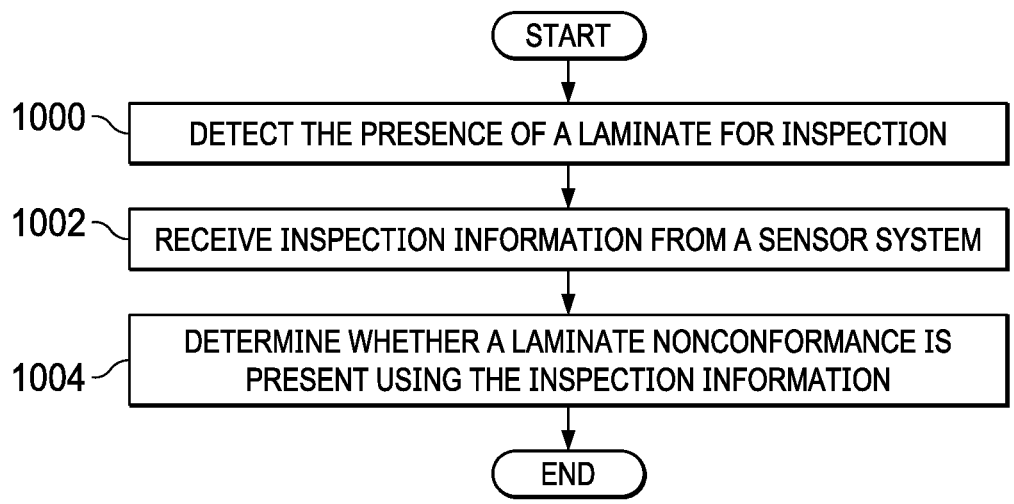
FIG. 10 is an illustration of a flowchart of a process for identifying laminate nonconformances in laminates in accordance with an illustrative embodiment.

With reference now to FIG. 10, an illustration of a flowchart of a process for identifying laminate nonconformances in laminates is depicted in accordance with an illustrative embodiment. The process in FIG. 10 can be implemented in hardware, software, or both. When implemented in software, the process can take the form of program code that is run by one of more processor units located in one or more hardware devices in one or more computer systems. For example, the process can be implemented in at least one of analyzer 218 or artificial intelligence system 242 in computer system 220 in FIG. 2.

The process begins by detecting the presence of a laminate for inspection (operation 1000). The process receives inspection information from a sensor system (operation 1002). The inspection information includes at least one of video, images, or audio about the laminate being inspected.

The process determines whether a laminate nonconformance is present using the inspection information (operation 1004). In the illustrative example, operation 1004 is performed using an artificial intelligence system. In this example, the artificial intelligence system has been trained using prior layup information recorded for prior layup of layers for prior workpieces, prior inspection information about prior laminates formed from the prior workpieces, and prior user input identifying prior nonconformances in the prior laminates. The process terminates thereafter.

Figure 11:
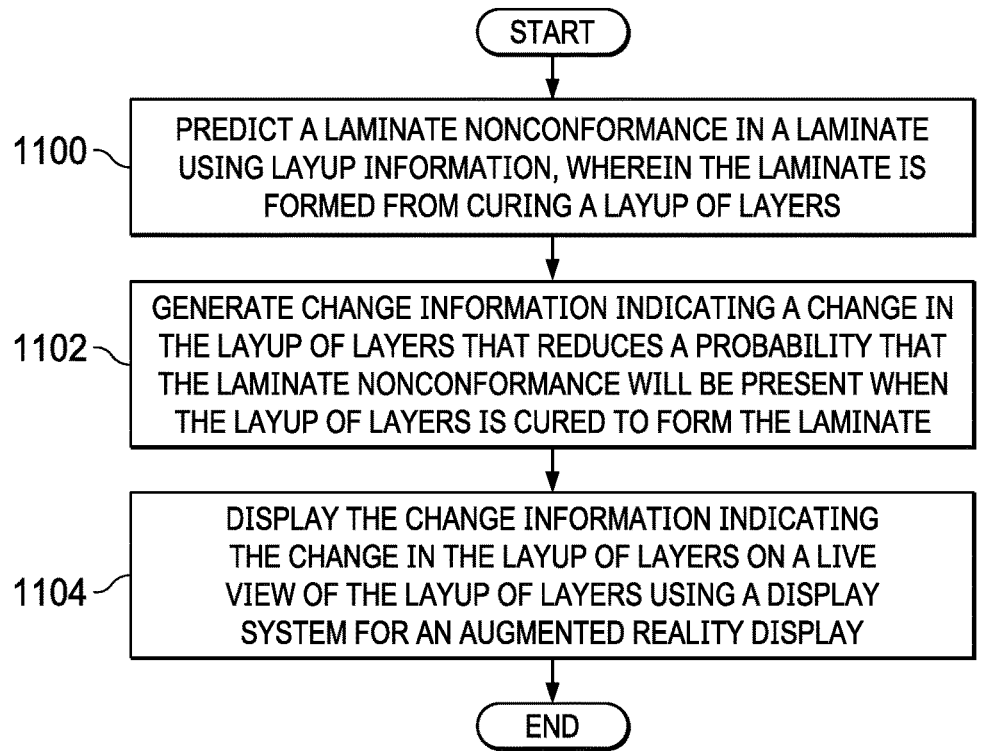
FIG. 11 is an illustration of a flowchart of a process for predicting laminate nonconformances in laminates in accordance with an illustrative embodiment.

With reference now to FIG. 11, an illustration of a flowchart of a process for predicting laminate nonconformances in laminates is depicted in accordance with an illustrative embodiment. The process in FIG. 11 can be implemented in hardware, software, or both. When implemented in software, the process can take the form of program code that is run by one or more processor units located in one or more hardware devices in one or more computer systems. For example, the process can be implemented in at least one of analyzer 218 or artificial intelligence system 242 in computer system 220 in FIG. 2.

The process begins by predicting a laminate nonconformance in a laminate using layup information, wherein the laminate is formed from curing a layup of layers (operation 1100). Layup information is about the layup of layers to form the workpiece. This layup information can include at least one of video, images, or audio.

For example, an image of a layer can be generated after the layer in the layup of layers is placed to form the workpiece. In other illustrative examples, a video can be generated of the entire process that shows how layers are laid or placed up by a human operator. The video also may include instructions from the human operator explaining how to place layers or remove nonconformances in different layers.

The prediction can be made at a number of different times. For example, the prediction can be made after each layer of material in the layup of the layer of materials is laid up or after the layup of layers is completed to form the workpiece.

The process generates change information indicating a change in the layup of layers that reduces a probability that the laminate nonconformance will be present when the layup of layers is cured to form the laminate (operation 1102). The process displays the change information indicating the change in the layup of layers on a live view of the layup of layers using a display system for an augmented reality display (operation 1104). The process terminates thereafter. With the change information, the workpiece or layers in the layup of layers in the workpiece can be adjusted, reworked, or discarded, reducing the manufacturing of laminates that have laminate nonconformances.

Figure 12:
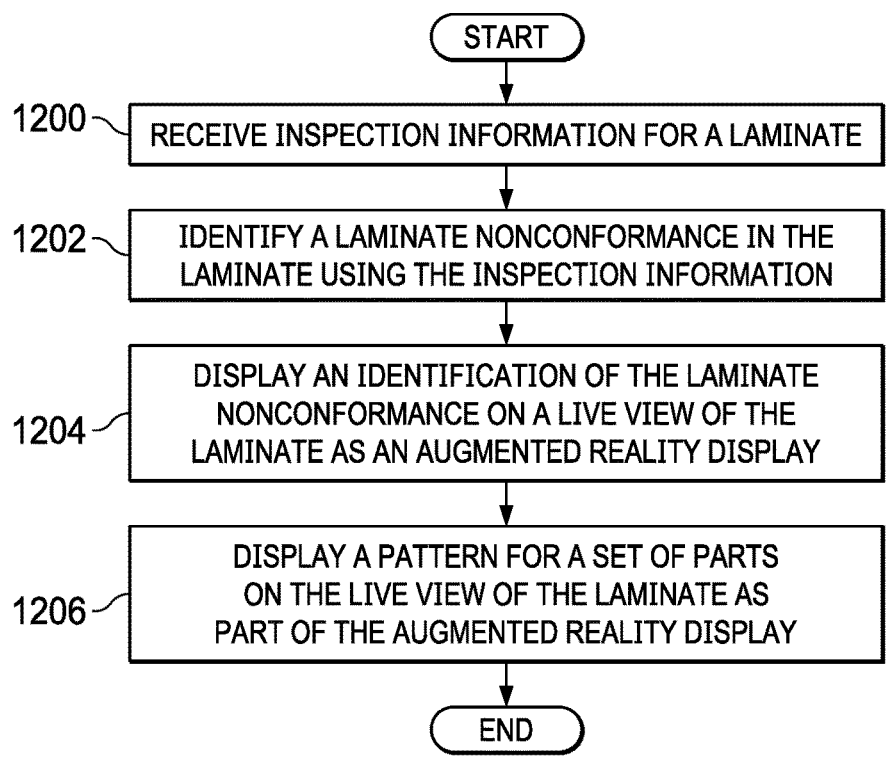
FIG. 12 is an illustration of a flowchart of a process for processing a laminate with a laminate nonconformance in accordance with an illustrative embodiment.

With reference next to FIG. 12, an illustration of a flowchart of a process for processing a laminate with a laminate nonconformance is depicted in accordance with an illustrative embodiment. The process in FIG. 12 can be implemented in hardware, software, or both. When implemented in software, the process can take the form of program code that is run by one or more processor units located in one or more hardware devices in one or more computer systems. For example, the process can be implemented in at least one of analyzer 218 or artificial intelligence system 242 in computer system 220 in FIG. 2.

The process receives inspection information for a laminate (operation 1200). In this example, the process receives the inspection information from a sensor system, such as sensor system 212 in FIG. 2. The process identifies a laminate nonconformance in the laminate using the inspection information (operation 1202).

The process displays an identification of the laminate nonconformance on a live view of the laminate as an augmented reality display (operation 1204). The identification can be a graphical indicator that is displayed in the laminate nonconformance. The graphical indicator can overlay or encompass the laminate nonconformance. The identification can also include other information, such as a nonconformance type.

The process displays a pattern for a set of parts on the live view of the laminate as part the augmented reality display (operation 1206). The process terminates thereafter.

The display of the identification of the laminate nonconformance and the pattern can be viewed by a human operator to determine whether the laminate can be used to fabricate the set of parts. In one example, if the laminate cannot be use with the current pattern, a different pattern can be selected for review by a human operator. In some cases, the laminate nonconformance falls outside of a set of cutouts for the set of parts. In other cases, when multiple parts are present in the set of parts, the laminate nonconformance may only be within one cutout in the cutouts enabling the laminate to be used to fabricate some of the parts.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
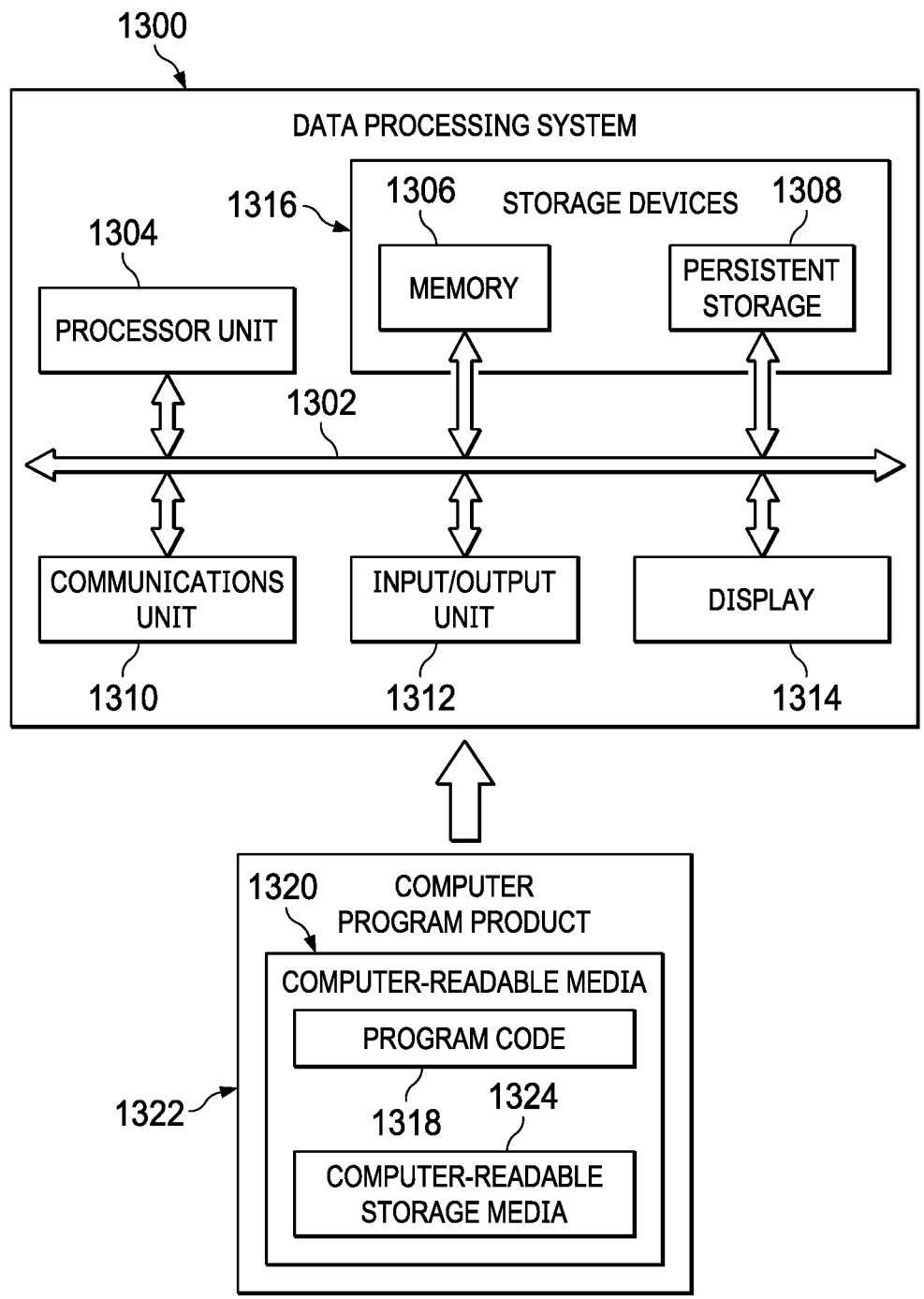
FIG. 13 is an illustration of a block diagram of a data processing system in accordance with an illustrative embodiment.

Turning now to FIG. 13, an illustration of a block diagram of a data processing system is depicted in accordance with an illustrative embodiment. Data processing system 1300 can be used to implement server computer 104 and client computer 106 in FIG. 1. Data processing system 1300 can also be used to implement computer system 220 in FIG. 2.

In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, can be, for example, a random-access memory or any other suitable volatile or non-volatile storage device. Persistent storage 1308 can take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 can provide a connection for user input through at least one of a keyboard, a mouse, or some other suitable input device. Further, input/output unit 1312 can send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which can be located in a memory, such as memory 1306.

These instructions are referred to as program code, computer usable program code, or computer-readable program code that can be read and executed by a processor in processor unit 1304. The program code in the different embodiments can be embodied on different physical or computer-readable storage media, such as memory 1306 or persistent storage 1308.

Program code 1318 is located in a functional form on computer-readable media 1320 that is selectively removable and can be loaded onto or transferred to data processing system 1300 for execution by processor unit 1304. Program code 1318 and computer-readable media 1320 form computer program product 1322 in these illustrative examples. In the illustrative example, computer-readable media 1320 is computer-readable storage media 1324.

In these illustrative examples, computer-readable storage media 1324 is a physical or tangible storage device used to store program code 1318 rather than a medium that propagates or transmits program code 1318.

Alternatively, program code 1318 can be transferred to data processing system 1300 using a computer-readable signal media. The computer-readable signal media can be, for example, a propagated data signal containing program code 1318. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1300 are not meant to provide architectural limitations to the manner in which different embodiments can be implemented. In some illustrative examples, one or more of the components may be incorporated in or otherwise form a portion of, another component. For example, memory 1306, or portions thereof, can be incorporated in processor unit 1304 in some illustrative examples. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program code 1318.

Figure 14:
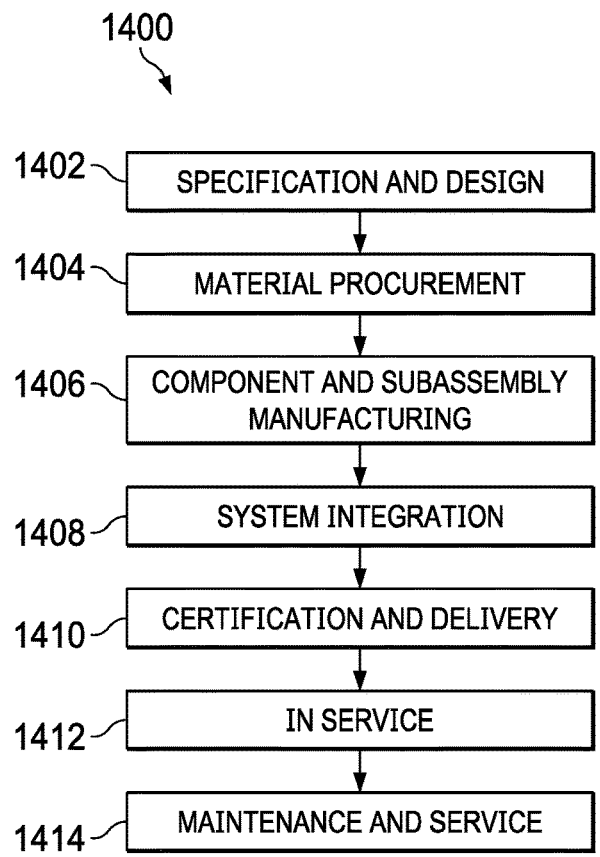
FIG. 14 is an illustration of a block diagram of an aircraft manufacturing and service method in accordance with an illustrative embodiment.
Figure 15:
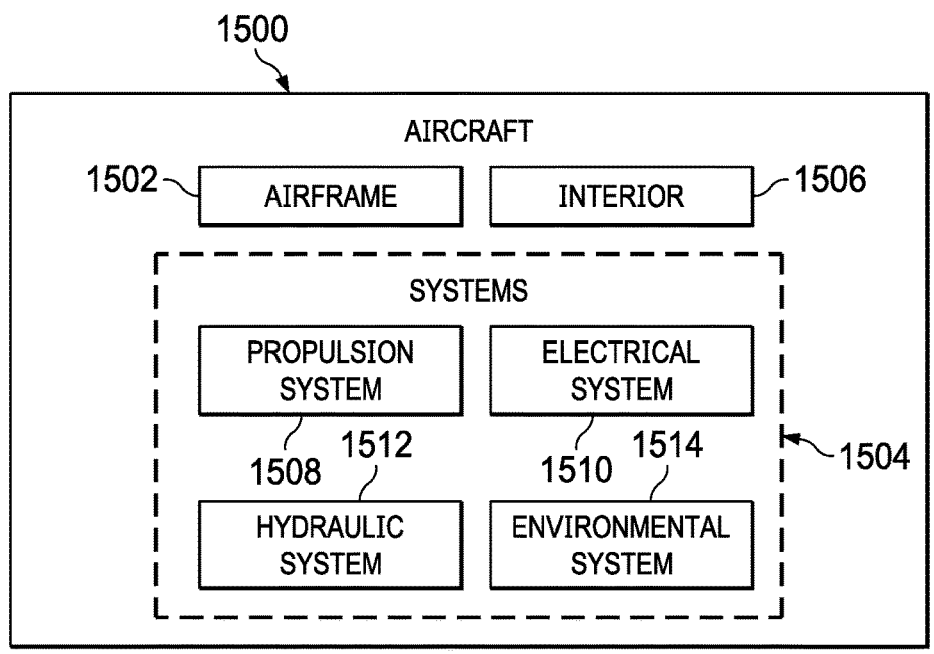
FIG. 15 is an illustration of a block diagram of an aircraft in which an illustrative embodiment may be implemented.

Illustrative embodiments of the disclosure may be described in the context of aircraft manufacturing and service method 1400 as shown in FIG. 14 and aircraft 1500 as shown in FIG. 15. Turning first to FIG. 14, an illustration of a block diagram of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 can go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of a block diagram of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14.

In one illustrative example, components or subassemblies produced in component and subassembly manufacturing 1406 in FIG. 14 can be fabricated or manufactured in a manner similar to components or subassemblies produced while aircraft 1500 is in service 1412 in FIG. 14. As yet another example, one or more apparatus embodiments, method embodiments, or a combination thereof can be utilized during production stages, such as component and subassembly manufacturing 1406 and system integration 1408 in FIG. 14. One or more apparatus embodiments, method embodiments, or a combination thereof may be utilized while aircraft 1500 is in service 1412, during maintenance and service 1414 in FIG. 14, or both.

For example, analyzer 218 can be used during at least one of component and subassembly manufacturing 1406 or maintenance and service 1414 to manufacturing parts from laminates. The efficiency can be increased and the cost can be decreased in manufacturing parts by employing nonconformance management system 210 to reduce nonconformances in laminates used for parts. The use of a number of the different illustrative embodiments may substantially expedite the assembly of aircraft 1500, reduce the cost of aircraft 1500, or both expedite the assembly of aircraft 1500 and reduce the cost of aircraft 1500.

Figure 16:
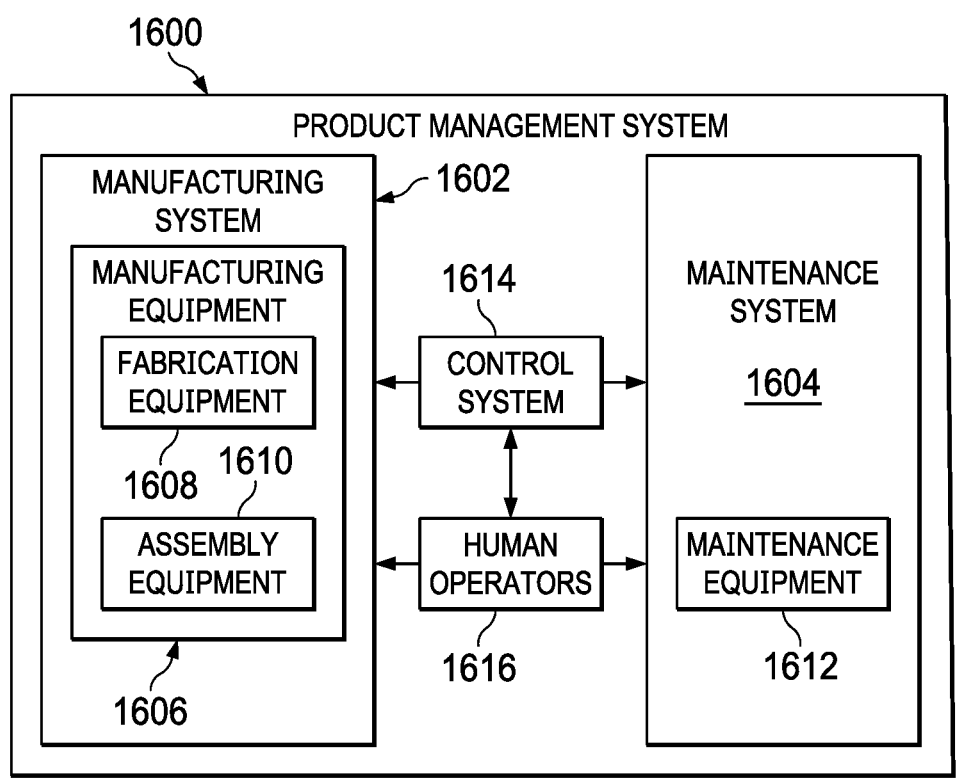
FIG. 16 is an illustration of a block diagram of a product management system in accordance with an illustrative embodiment.

Turning now to FIG. 16, an illustration of a block diagram of a product management system is depicted in accordance with an illustrative embodiment. Product management system 1600 is a physical hardware system. In this illustrative example, product management system 1600 includes at least one of manufacturing system 1602 or maintenance system 1604.

Manufacturing system 1602 is configured to manufacture products, such as aircraft 1500 in FIG. 15. As depicted, manufacturing system 1602 includes manufacturing equipment 1606. Manufacturing equipment 1606 includes at least one of fabrication equipment 1608 or assembly equipment 1610.

Fabrication equipment 1608 is equipment that used to fabricate components for parts used to form aircraft 1500 in FIG. 15. For example, fabrication equipment 1608 can include machines and tools. These machines and tools can be at least one of a drill, a hydraulic press, a furnace, a mold, a composite tape laying machine, a vacuum system, a lathe, or other suitable types of equipment. Fabrication equipment 1608 can be used to fabricate at least one of metal parts, composite parts, semiconductors, circuits, fasteners, ribs, skin panels, spars, antennas, or other suitable types of parts.

Assembly equipment 1610 is equipment used to assemble parts to form aircraft 1500 in FIG. 15. In particular, assembly equipment 1610 is used to assemble components and parts to form aircraft 1500 in FIG. 15. Assembly equipment 1610 also can include machines and tools. These machines and tools may be at least one of a robotic arm, a crawler, a faster installation system, a rail-based drilling system, or a robot. Assembly equipment 1610 can be used to assemble parts such as seats, horizontal stabilizers, wings, engines, engine housings, landing gear systems, and other parts for aircraft 1500 in FIG. 15.

In this illustrative example, maintenance system 1604 includes maintenance equipment 1612. Maintenance equipment 1612 can include any equipment needed to perform maintenance on aircraft 1500 in FIG. 15. Maintenance equipment 1612 may include tools for performing different operations on parts on aircraft 1500 in FIG. 15. These operations can include at least one of disassembling parts, refurbishing parts, inspecting parts, reworking parts, manufacturing replacement parts, or other operations for performing maintenance on aircraft 1500 in FIG. 15. These operations can be for routine maintenance, inspections, upgrades, refurbishment, or other types of maintenance operations.

In the illustrative example, maintenance equipment 1612 may include ultrasonic inspection devices, x-ray imaging systems, vision systems, drills, crawlers, and other suitable devices. In some cases, maintenance equipment 1612 can include fabrication equipment 1608, assembly equipment 1610, or both to produce and assemble parts that needed for maintenance.

Product management system 1600 also includes control system 1614. Control system 1614 is a hardware system and may also include software or other types of components. Control system 1614 is configured to control the operation of at least one of manufacturing system 1602 or maintenance system 1604. In particular, control system 1614 can control the operation of at least one of fabrication equipment 1608, assembly equipment 1610, or maintenance equipment 1612.

The hardware in control system 1614 can be implemented using hardware that may include computers, circuits, networks, and other types of equipment. The control may take the form of direct control of manufacturing equipment 1606. For example, robots, computer-controlled machines, and other equipment can be controlled by control system 1614. In other illustrative examples, control system 1614 can manage operations performed by human operators 1616 in manufacturing or performing maintenance on aircraft 1500. For example, control system 1614 can assign tasks, provide instructions, display models, or perform other operations to manage operations performed by human operators 1616. In these illustrative examples, nonconformance management system 210 from FIG. 2 can be implemented in control system 1614 to manage at least one of the manufacturing or maintenance of aircraft 1500 in FIG. 15. For example, analyzer 218 can operate to aid in identifying and reducing nonconformances in laminates manufactured for use in creating parts for at least one of manufacturing or performing maintenance on aircraft 1500 in FIG. 15.

In the different illustrative examples, human operators 1616 can operate or interact with at least one of manufacturing equipment 1606, maintenance equipment 1612, or control system 1614. This interaction can occur to manufacture aircraft 1500 in FIG. 15.

Of course, product management system 1600 may be configured to manage other products other than aircraft 1500 in FIG. 15. Although product management system 1600 has been described with respect to manufacturing in the aerospace industry, product management system 1600 can be configured to manage products for other industries. For example, product management system 1600 can be configured to manufacture products for the automotive industry as well as any other suitable industries.

Thus, the illustrative examples provide a method, an apparatus, and a system for managing nonconformances in laminates. In one illustrative example, a nonconformance management system comprises a sensor system and an analyzer in a computer system. A workpiece platform supports a layup of layers laid up on the workpiece platform to form a workpiece. The inspection platform supports a laminate formed from the workpiece. The sensor that records layup information about the layup of layers on the workpiece platform and records inspection information about the laminate located on an inspection platform, wherein the laminate is formed from curing the workpiece. The analyzer in the computer system identifies a laminate nonconformance in the laminate using the inspection information; generates nonconformance information about the laminate nonconformance, and displays the nonconformance information about the laminate nonconformance on the laminate using a display system for an augmented reality display.

The nonconformance management system operates to reduce nonconformances occurring in laminates. For example, the system can also operate to perform root cause analysis to identify causes of nonconformances occurring prior to a workpiece comprising a layup of layers being cured to form the laminate. The identification of causes can be used to make changes to at least one of techniques employed to lay up layers, materials for layers, suppliers or layers, or other changes. Further, the system can be used to perform part selection for laminate when a nonconformance is present in a laminate.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing manufacturing of a laminate, the method comprising:

recording, by a sensor system, layup information about a layup of layers on a workpiece platform, wherein the layup of layers forms a workpiece;

recording, by the sensor system, inspection information about the laminate on an inspection platform, wherein the laminate is formed from curing the workpiece;

identifying, by an analyzer in a computer system, a laminate nonconformance in the laminate using the inspection information;

receiving, by a user input system, a user input verifying the laminate nonconformance in the laminate is present; and training, by the computer system, an artificial intelligence system using the layup information, the inspection information, and the user input verifying the laminate nonconformance.

2. The method of claim 1 further comprising:

predicting the laminate nonconformance in the laminate using the layup information, wherein the laminate is formed from curing the layup of layers;

generating change information indicating a change in the layup of layers that reduces a probability that the laminate nonconformance will be present when the layup of layers is cured to form the laminate; and displaying the change information indicating the change in the layup of layers on a live view of the layup of layers using a display system for an augmented reality display.

3. The method of claim 2 further comprising:

receiving another user input verifying whether the laminate nonconformance predicted for the laminate is present in the laminate.

4. The method of claim 1 further comprising:

identifying a set of parts and a part type that can be formed from the laminate using an identifier and nonconformance information about the laminate nonconformance.

5. The method of claim 1 further comprising:

determining a status of the laminate based on a set of patterns for a set of parts.

6. The method of claim 1, wherein the user input describing the laminate nonconformance comprises at least one of a location of the laminate nonconformance, a region containing the laminate nonconformance, a nonconformance type, or a laminate status.

7. The method of claim 1, wherein the layup of layers comprises a first outer layer, a core layer, and a second outer layer, wherein the core layer is located between the first outer layer and the second outer layer.

8. The method of claim 7, wherein the layup of layers further comprises at least one of a release sheet, a texture blanket, or a coating layer.

9. A method for managing manufacturing of a laminate, the method comprising:

recording, by a sensor system, layup information about a layup of layers on a workpiece platform, wherein the layup of layers forms a workpiece;

recording, by the sensor system, inspection information about the laminate on an inspection platform, wherein the laminate is formed from curing the workpiece;

identifying, by an analyzer in a computer system, a laminate nonconformance in the laminate using the inspection information;

generating, by the analyzer, nonconformance information about the laminate nonconformance;

receiving, by a user input system, a user input describing the laminate nonconformance in the laminate on the inspection platform; and requesting, by the analyzer, the user input to verify whether an identification of the laminate nonconformance in the laminate identified by the analyzer is correct when the identification of the laminate nonconformance in the laminate identified by the analyzer has a confidence level that is less than a threshold for proceeding without the user input.

10. The method of claim 9 further comprising:
predicting the laminate nonconformance in the laminate using the layup information, wherein the laminate is formed from curing the layup of layers;
generating change information indicating a change in the layup of layers that reduces a probability that the laminate nonconformance will be present when the layup of layers is cured to form the laminate; and
displaying the change information indicating the change in the layup of layers on a live view of the layup of layers using a display system for an augmented reality display.

11. The method of claim 10 further comprising:
receiving another user input verifying whether the laminate nonconformance predicted for the laminate is present in the laminate.

12. The method of claim 9 further comprising:
identifying a set of parts and a part type that can be formed from the laminate using an identifier and nonconformance information about the laminate nonconformance.

13. The method of claim 9 further comprising:
determining a status of the laminate based on a set of patterns for a set of parts.

14. The method of claim 9, wherein the user input describing the laminate nonconformance comprises at least one of a location of the laminate nonconformance, a region containing the laminate nonconformance, a nonconformance type, or a laminate status.

15. The method of claim 9, wherein the layup of layers comprises a first outer layer, a core layer, and a second outer layer, wherein the core layer is located between the first outer layer and the second outer layer.

16. A method for managing manufacturing of a laminate, the method comprising:
recording, by a sensor system, layup information about a layup of layers on a workpiece platform, wherein the layup of layers forms a workpiece;
recording, by the sensor system, inspection information about the laminate on an inspection platform, wherein the laminate is formed from curing the workpiece;
identifying, by an analyzer in a computer system, a laminate nonconformance in the laminate using the inspection information;
generating, by the analyzer, nonconformance information about the laminate nonconformance;
receiving, by a user input system, a user input describing the laminate nonconformance in the laminate on the inspection platform; and
requesting, by the analyzer, the user input to verify whether an identification of the laminate nonconformance in the laminate identified by the analyzer is correct based on a setting that indicates that an operator is to be prompted for a verification.

17. The method of claim 16 further comprising:
predicting the laminate nonconformance in the laminate using the layup information, wherein the laminate is formed from curing the layup of layers;
generating change information indicating a change in the layup of layers that reduces a probability that the laminate nonconformance will be present when the layup of layers is cured to form the laminate; and
displaying the change information indicating the change in the layup of layers on a live view of the layup of layers using a display system for an augmented reality display.

18. The method of claim 17 further comprising:
receiving another user input verifying whether the laminate nonconformance predicted for the laminate is present in the laminate.

19. The method of claim 16 further comprising:
identifying a set of parts and a part type that can be formed from the laminate using an identifier and nonconformance information about the laminate nonconformance.

20. The method of claim 16 further comprising:
determining a status of the laminate based on a set of patterns for a set of parts.

* * * * *